(12) United States Patent
Zhao et al.

(10) Patent No.: US 12,724,247 B2
(45) Date of Patent: Sep. 1, 2026

(54) OPTICAL SYSTEM AND OPTICAL CAMERA WORKING AT FAR-INFRARED WAVEBAND

(71) Applicant: SHENZHEN METALENX TECHNOLOGY CO., LTD, Shenzhen (CN)

(72) Inventors: Xiaobo Zhao, Shenzhen (CN); Ziliang Zhao, Shenzhen (CN); Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 215 days.

(21) Appl. No.: 18/826,130

(22) Filed: Sep. 5, 2024

(65) Prior Publication Data

US 2025/0110318 A1 Apr. 3, 2025

(30) Foreign Application Priority Data

Sep. 28, 2023 (CN) ......................... 202311275213.0
Sep. 28, 2023 (CN) ......................... 202322657537.2

(51) Int. Cl.
*G02B 13/00* (2006.01)
*G02B 1/00* (2006.01)
*G02B 3/00* (2006.01)

(52) U.S. Cl.
CPC ........... *G02B 13/008* (2013.01); *G02B 1/002* (2013.01); *G02B 3/0006* (2013.01); *G02B 13/0035* (2013.01); *G02B 13/0055* (2013.01); *G02B 2207/101* (2013.01)

(58) Field of Classification Search
CPC .............. G02B 13/008; G02B 13/0035; G02B 13/0055; G02B 1/002; G02B 3/0006; G02B 2207/101
USPC .......................................................... 359/356
See application file for complete search history.

(56) References Cited

FOREIGN PATENT DOCUMENTS

| CN | 106443938 | | 2/2017 |
|---|---|---|---|
| CN | 217181326 U | * | 8/2022 |

* cited by examiner

*Primary Examiner* — Bumsuk Won
*Assistant Examiner* — Mitchell T Oestreich
(74) *Attorney, Agent, or Firm* — JCIPRNET

(57) ABSTRACT

An optical system and an optical camera working at a far-infrared waveband are provided, the optical system including three optical elements, the three optical elements being, along the optical axis in order from an object side to an image side: a first sulfur refractive lens, a metalens and a second sulfur refractive lens; the first sulfur refractive lens and the second sulfur refractive lens have positive refractive power; each of three optical elements including an object-side surface facing towards the object side and an image-side surface facing towards the image side; the metalens includes a substrate and a plurality of unit cells, and a plurality of nanostructures are set in the unit cells; the optical system satisfies the following condition with a unit of 1/mm:

$$0.25 \leq n*(|C_1|+|C_2|) \leq 2.01.$$

18 Claims, 21 Drawing Sheets

OPTICAL SYSTEM AND OPTICAL CAMERA WORKING AT FAR-INFRARED WAVEBAND

CROSS-REFERENCE TO RELATED APPLICATION

This application claims the benefit of priority from Chinese Patent Application No. 202311275213.0 and No. 202322657537.2, filed on Sep. 28, 2023. The entirety of each of the above-mentioned patent applications is hereby incorporated by reference herein and made a part of this specification.

TECHNICAL FIELD

The present disclosure relates to a field of an optical lens, in particular to an optical system and an optical camera working at a far-infrared waveband.

BACKGROUND

Because the optical system working at the far-infrared waveband can well adapt to the rain, night, fog and other working environments, it is widely used in the vehicle, security and other fields. However, the optical system provided in the far-infrared waveband is difficult to satisfy the requirements of the optical system for good imaging quality, small volume, athermalization and high processing capability of the lens at the same time.

SUMMARY

In order to solve the above technical problem, an optical system and an optical camera are provided according to the present application. The optical system provided by the present application is capable of satisfying the requirements of the optical system for good imaging quality, small volume, athermalization and high processing capability of the lens at the same time.

In the first aspect, an optical system working at a far-infrared waveband is provided, including three optical elements, the three optical elements being, along the optical axis in order from an object side to an image side: a first sulfur refractive lens, a metalens and a second sulfur refractive lens;

- the first sulfur refractive lens and the second sulfur refractive lens have positive refractive power;
- each of three optical elements including an object-side surface facing towards the object side and an image-side surface facing towards the image side;
- the metalens includes a substrate and a plurality of unit cells, and a plurality of nanostructures are set in the unit cells;
- the optical system satisfies the following condition with a unit of 1/mm:

$$0.25 \leq n*(|C_1|+|C_2|) \leq 2.01.$$

- where when n is a refractive index of the first sulfur refractive lens, C1 is a curvature of the object-side surface of the first refractive lens, C2 is a curvature of the image-side surface of the first refractive lens; when n is a refractive index of the second sulfur refractive lens, C1 is a curvature of the object-side surface of the second refractive lens, C2 is a curvature of the image-side surface of the second refractive lens.

Optionally, the optical system satisfies the following condition with a unit of 1/mm:

$$0.36 \leq n*(|C_1|+|C_2|) \leq 1.06.$$

- where when n is a refractive index of the first sulfur refractive lens, C1 is a curvature of the object-side surface of the first refractive lens, C2 is a curvature of the image-side surface of the first refractive lens; when n is a refractive index of the second sulfur refractive lens, C1 is a curvature of the object-side surface of the second refractive lens, C2 is a curvature of the image-side surface of the second refractive lens.

Optionally, the optical system satisfies the following condition with a unit of fs:

$$5.31 \leq \frac{GD*V}{1000} \leq 17.90$$

- where GD is a group delay of the plurality of nanostructures, V is the Abbe number of the first sulfur refractive lens or the second sulfur refractive lens.

Optionally, the optical system satisfies the following condition with a unit of fs:

$$6.77 \leq \frac{GD*V}{1000} \leq 16.11$$

- where GD is the group delay of the plurality of nanostructures, V is the Abbe number of the first sulfur refractive lens or the second sulfur refractive lens.

Optionally, the first sulfur refractive lens and the second sulfur refractive lens both are spherical lenses; and the optical system satisfies the following condition with a unit of rad/mm2:

$$0.48 \leq \frac{M}{f_1+f_2} \leq 1.34$$

- where M is the maximum value of the absolute slope of the phase of the metalens, f1 is a focal length of the first sulfur refractive lens, f2 is a focal length of the second sulfur refractive lens.

Optionally, the first sulfur refractive lens and the second sulfur refractive lens both are spherical lenses; and the optical system satisfies the following condition with a unit of rad/mm2:

$$0.52 \leq \frac{M}{f_1+f_2} \leq 1.00$$

- where M is the maximum value of the absolute slope of the phase of the metalens, f1 is the focal length of the first sulfur refractive lens, f2 is a focal length of the second sulfur refractive lens.

Optionally, the nanostructures are positive nanostructures.

Optionally, the nanostructures are negative nanostructures.

Optionally, the metalens includes at least one layer of the unit cells.

Optionally, the optical system further includes: an aperture slot; the aperture slot is set on a surface of the metalens.

Optionally, the optical system further includes: an aperture slot; an interval is set between the aperture slot and the metalens, and the interval is filled with air.

Optionally, the object-side surface of the first sulfur refractive lens is convex surface and the image-side surface of the first sulfur refractive lens is a concave surface;

the object-side surface of the second sulfur refractive lens and the image-side surface of the second sulfur refractive lens is a concave surface.

Optionally, a total track length of the optical system is less than or equal to 20 mm.

Optionally, a field of view of the optical system is greater than or equal to 31°.

Optionally, a F number of the optical system is less than or equal to 1.05.

Optionally, where the MTF of the optical system at all fields of view is greater than or equal to 0.2.

An optical camera working at a far-infrared waveband, where the optical camera includes a lens barrel, a pressure ring, a first disconnected ring, a second disconnected ring and the optical system;

the pressure ring is set inside the lens barrel;

the pressure ring is against the object-side surface of the first sulfur lens, the first disconnected ring and the object-side surface of the first sulfur lens are in direct contact with each other;

the first disconnected ring and the object-side surface of the metalens are in direct contact with each other;

the second disconnected ring and the object-side surface of the second sulfur refractive lens are in direct contact.

Optionally, the optical camera includes an optical window glass and an imaging sensor; the imaging sensor is set on the image plane of the optical system;

and the optical window glass is set between the second sulfur refractive lens and the imaging sensor.

The optical system provided by the present application, including three optical elements, the three optical elements being, along the optical axis in order from an object side to an image side: a first sulfur refractive lens, a metalens and a second sulfur refractive lens. By the cooperation of the first sulfur refractive lens, the metalens and the second sulfur refractive lens, the optical system provided by the present application has good image quality. Moreover, the thickness of the metalens is less than the thickness of the traditional lens, thus the volume of the optical system is significantly smaller than that of the optical system composed of at least 3 traditional lenses. Further, the optical system provided by the optical system satisfies: $0.25 \leq n^*(|C_1|+|C_2|) \leq 2.01$; where when n is a refractive index of the first sulfur refractive lens, $C_1$ is a curvature of the object-side surface of the first refractive lens, $C_2$ is a curvature of the image-side surface of the first refractive lens; when n is a refractive index of the second sulfur refractive lens, C1 is a curvature of the object-side surface of the second refractive lens, $C_2$ is a curvature of the image-side surface of the second refractive lens. The limitation of the condition ensure that the optical system can realize athermalization fully and have good process capability, and make the refractive lenses can collimate the lights fully to have good image quality. In summary, the optical system satisfies the requirements of good imaging quality, small volume, athermalization and high processing capability of the lens at the same time.

Other features and advantages of the present application will become apparent by the detailed description below, or will be acquired in part by the practice of the present application.

It should be understood that the above description is general, and the detailed description described below are exemplary only, and will not limit this application.

BRIEF DESCRIPTION OF THE DRAWINGS

The above and other targets, features and advantages of the example embodiment thereof by reference to the accompanying drawings.

DETAILED DESCRIPTION OF DISCLOSURED EMBODIMENTS

The embodiments will be described more comprehensively with reference to the accompanying drawings. However, the embodiments can be implemented in various forms and should not be understood to be limited to the examples elaborated herein; instead, providing these embodiments makes the description of this application more comprehensive and complete and fully communicates the idea of the embodiment to those skilled in the art. The attached drawings are only schematic illustrations of this application and are not necessarily proportional drawings. The same reference marks in the figure indicate the same or similar parts, and their repeated descriptions will be omitted.

Furthermore, the described features, structures or features may be combined in one or more embodiments in any suitable manner. In the following description, many specific details are provided to give a full understanding of the exemplary embodiments of this application. However, those skilled in the art will be aware that one or more of the specific details may be omitted from the present technical solution, or other modules, components, etc. may be adopted. In other cases, aspects of the present application are blurred without detailed showing or describing the public structure, method, implementation or operation to avoid over dominance.

In order to overcome the above disadvantages, an optical system and an optical camera working at a far-infrared waveband are provided by the present application, which can satisfy the requirements of the optical system for good imaging quality, small volume, athermalization and high processing capability of the lens at the same time.

Figure 1:
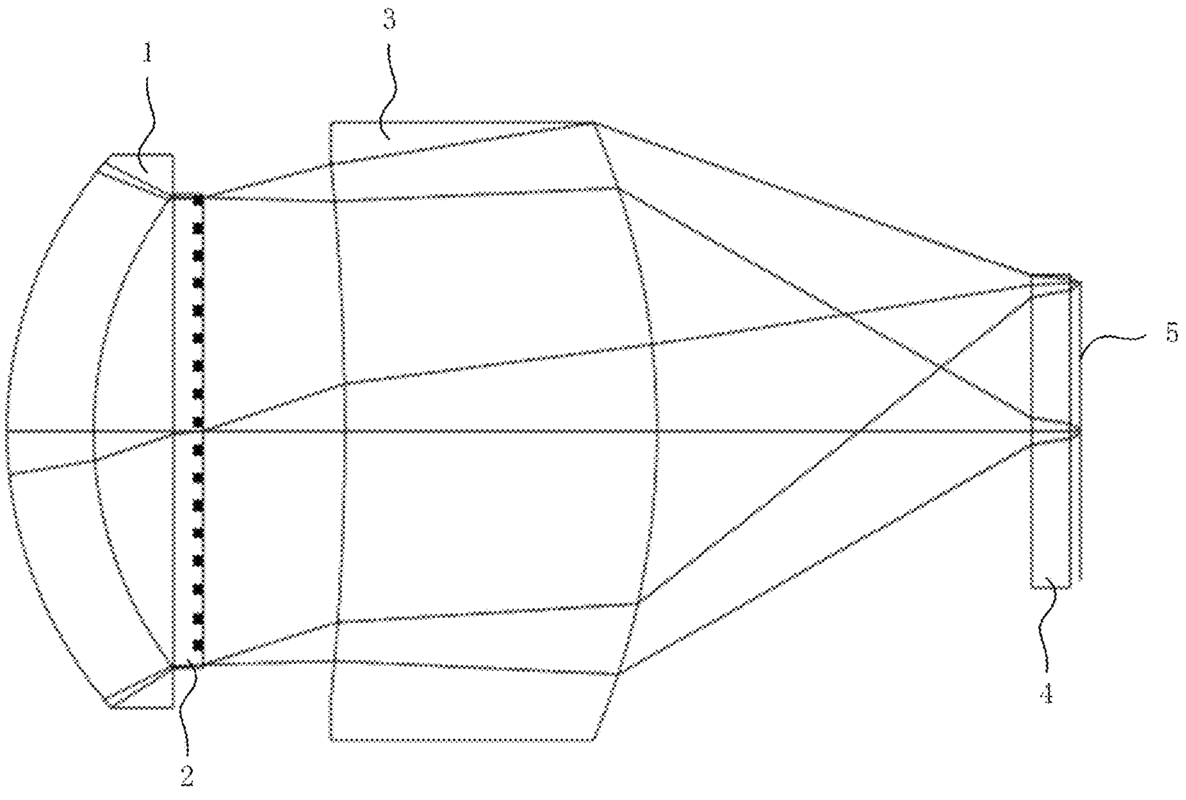
FIG. 1 shows a schematic diagram of the architectural layout of the optical system working at the far-infrared waveband in one embodiment provided by the present application.

FIG. 1 shows a schematic diagram of the architectural layout of the optical system working at the far-infrared waveband in one embodiment provided by the present application. As shown in FIG. 1, the optical system working at a far-infrared waveband, including three optical elements, the three optical elements being, along the optical axis in order from an object side to an image side: a first sulfur refractive lens, a metalens and a second sulfur refractive lens.

The first sulfur refractive lens and the second sulfur refractive lens have positive refractive power; each of three optical elements including an object-side surface facing towards the object side and an image-side surface facing towards the image side; the metalens includes a substrate and a plurality of unit cells, and a plurality of nanostructures are set in the unit cells. The unit cells may be set on the object-surface of the metalens, or may be set on the image-side of the metalens. The vertice or the center of the unit cell is set with nanostructures. The filler material filled between the nanostructures may be air or other transparent materials at the working waveband.

The optical system provided by the present application, the first sulfur refractive lens is configured to correct the low-order spherical aberrations in the optical system, and the second sulfur refractive lens is configured to collimate the lights. And when the second sulfur refractive lens collimates the lights, high-order spherical aberrations and chromatic aberrations will be produced. The metalens 2 is configured to correct the high-order spherical aberrations and chromatic aberrations produced by the second sulfur refractive lens and the off-axis aberrations. It is difficult for the first sulfur refractive lens 1 and the second sulfur refractive lens 3 to correct the off-axis aberrations. The off-axis aberrations in the present application mainly include comas, distortions and off-axis spherical aberrations.

Therefore, the optical system provided by the present application has good image quality by the cooperation of the first sulfur refractive lens 1, the metalens 2 and the second sulfur refractive lens 3. And the thickness of the metalens is much less than the thickness of the traditional lens. Therefore, the volume of the optical system provided in this application is greatly reduced compared to the optical system with at least three traditional lenses in the related technology.

Further, since the first sulfur refractive lens 1 and the second sulfur refractive lens 3 are made of sulfur glass materials, compared with other materials, the refraction temperature coefficient of the sulfur glass materials is lower, the sulfur glass materials can help the athermalization of the optical system. Furthermore, the optical system satisfies the following condition with a unit of 1/mm:

$$0.25 \le n*(|C_1|+|C_2|) \le 2.01 \quad (1)$$

Where when n is a refractive index of the first sulfur refractive lens, $C_1$ is a curvature of the object-side surface of the first refractive lens, $C_2$ is a curvature of the image-side surface of the first refractive lens; when n is a refractive index of the second sulfur refractive lens, $C_1$ is a curvature of the object-side surface of the second refractive lens, $C_2$ is a curvature of the image-side surface of the second refractive lens. And n is a dimensionless parameter; and the unit of $C_1$ and $C_2$ is 1/mm.

In detail, the condition (1) composed of n, $C_1$ and $C_2$ restrains the first sulfur refractive lens 1 and the second sulfur refractive lens 3. The lowest value of the condition (1) is 0.25, which avoids the curvature of the refractive lens (including the first sulfur refractive lens and the second sulfur refractive lens) being too small and makes sure that the refractive index of the refractive lenses keeps a smaller value and the refractive lenses can provide enough focal power. Thus the refractive lenses can fully collimate the lights, so as to make sure that the optical system has good image quality.

It should be noted that the refractive index of the refractive lens is greater, the proportion of its role in the optical system is greater, and the influence on the optical system due to the temperature change is greater. Moreover, the curvature of the refractive lens is greater, the influence of the refractive lens is more due to the temperature changes, and the influence of the optical system is more due to the temperature changes. Therefore, the processing capability of the refractive lens is ensured by setting the highest-value of condition (1) as 2.01. In this way, the refractive index and curvature of the refractive lens avoid being too large at the same time, so as to avoid the performance index being to poor when the temperature is too high or too low. Thus the optical system realizes the design requirement of athermalization, and make sure that the refractive lens has good processing capability.

Thus, the optical system provided in this application fully ensures the refractive lens has good processing capability by condition (1) composed of n, $C_1$, and $C_2$ and also makes the refractive lens fully collimate the lights, thus the optical system can have a good image quality.

In conclusion, the optical system provided in this application has good image quality, including the design requirements of the optical system for good image quality, small volume, athermalization, and high processing capability of lens.

Preferably, in one embodiment, the optical system satisfies the following condition with a unit of 1/mm:

$$0.36 \le n*(|C_1|+|C_2|) \le 1.06 \quad (2)$$

In one embodiment, the object-side surface of the first sulfur refractive lens is convex surface and the image-side surface of the first sulfur refractive lens is a concave surface; the object-side surface of the second sulfur refractive lens and the image-side surface of the second sulfur refractive lens is a concave surface. In this embodiment, the first sulfur refractive lens is crescent and is towards the object side, and the second sulfur refractive lens is crescent and is towards the image side.

In one embodiment, the optical system satisfies the following condition with a unit of fs:

$$5.31 \le \frac{GD*V}{1000} \le 17.90 \quad (3)$$

Where GD is a group delay of the plurality of nanostructures, V is the Abbe number of the first sulfur refractive lens or the second sulfur refractive lens. The unit of GD is femtosecond, and V is a dimensionless parameter.

In detail, the phase φ of the nanostructure located at the radial position r on the metalens 2 at the angle frequency of ω may be described by φ(r, ω). The GD may be obtained after the Taylor expansion, and the first order expansion term of is the GD. It should be noted that one nanostructure usually provides different phases at different wavelengths, so there is a certain phase variation for one nanostructure at different wavelengths. If the GD of the nanostructure at a certain position is larger, the larger the phase variation of the phases provided by different wavelengths is larger. Therefore, the GD can be regarded as the dispersion coefficient of the nanostructures, and then can be used to describe the dispersion produced by the nanostructures.

It should be noted that the dispersion produced by the nanostructures in the metalens 2 is negative, that is, if the wavelength of the light is longer, the deflective angle of the light is larger. And it is opposite to the traditional refractive lens. The dispersion of the traditional refractive lens is positive, that is, if the wavelength of the light is longer, the deflective angle of the light is smaller. And the positive dispersion may be described by Abbe number as follows: the Abbe number is larger, and the positive dispersion of the refractive lens is smaller; in the contrary, the Abbe number is smaller, and the positive dispersion is larger. Therefore, the negative dispersion of the metalens 2 and the positive dispersion of the refractive lens may be balanced by condition (3) composed of GD and V, so as to realize the correction of the dispersion.

Preferably, in one embodiment, the optical system provided by the present application satisfies:

$$6.77 \leq \frac{GD * V}{1000} \leq 16.11 \tag{4}$$

In one embodiment, because the integrated performance of aspherical lens is better than the integrated performance of spherical lens, when the first sulfur refractive lens and the second sulfur refractive lens are aspherical lenses, the first sulfur refractive lens and the second sulfur refractive lens provide a better basic for good image quality.

In one embodiment, the first sulfur refractive lens 1 and the second sulfur refractive lens 3 may be spherical lenses for reducing costs. In this situation, in order to make sure the optical system still has good image quality, the optical system satisfies the following condition with a unit of rad/mm$^2$:

$$0.48 \leq \frac{M}{f_1 + f_2} \leq 1.34 \tag{5}$$

Where M is the maximum value of the absolute slope of the phase of the metalens, $f_1$ is a focal length of the first sulfur refractive lens, $f_2$ is a focal length of the second sulfur refractive lens.

In detail, M may be used to be the focal power: M is greater, which indicates the off-axis focal power provided by the metalens 2 is greater, and the ability of off-axis deflection for lights of the metalens is greater; in the contrary, M is smaller, which indicates the off-axis focal power provided by the metalens 2 is smaller, and the ability of off-axis deflection for lights of the metalens is smaller.

Therefore, in the present embodiment, the lowest value of condition (5) composed of M, $f_1$ and $f_2$ is configured to be 0.48, which can make sure the metalens 2 has enough ability of off-axis deflection for lights, thus the off-axis aberrations will be corrected fully, especially for the coma, distortion and off-axis spherical aberration. The first sulfur refractive lens and second sulfur refractive lens are spherical lenses, and it's difficult for the two refractive lenses to correct the off-axis aberrations. The highest value of condition (5) is configured to be 1.34, so as to avoid the metalens 2 having too much ability of off-axis deflection for lights, so as to avoid the metalens producing too much chromatic aberration.

Preferably, in one embodiment, the optical system satisfies the following condition with a unit of rad/mm$^2$:

$$0.52 \leq \frac{M}{f_1 + f_2} \leq 1.00 \tag{6}$$

In one embodiment, the nanostructure may be a positive nanostructure; or the nanostructure may be a negative nanostructure. When the metalens 2 is assembled with other structural parts, the negative nanostructure is less susceptible to damage than the positive nanostructure.

Moreover, in order to further improve the transmittance of the metalens in the far-infrared waveband, the present embodiment may be covered on the side with nanostructures on the substrate. Specifically, when the nanostructure is a positive nanostructure, the antireflection film covers the area with the nanostructure on the surface of the substrate; and when the nanostructure is a negative nanostructure, the antireflection film covers the area without the nanostructure on the surface of the substrate.

In one embodiment, the metalens includes at least one layer of the unit cells.

In the present embodiment, the metalens 2 may include one layer of unit cells, or may include multi-layer of unit cells. Compared with the one layer of unit cells, the metalens including multiple layers of unit cells has higher degree of freedom when the metalens modulates the lights.

In one embodiment, the optical system further includes: an aperture slot; the aperture slot is set on a surface of the metalens. The optical system further includes: an aperture slot; an interval is set between the aperture slot and the metalens, and the interval is filled with air.

In the present embodiment, the optical system includes an aperture slot to control the light intake. And the aperture slot is next to the metalens 2. Specifically, the aperture slot may be set on the object-side of the metalens; or the aperture slot may be set on the image-side of the metalens; or there may be an interval between the aperture slot and the metalens, and no other optical elements are set between the aperture slot and the metalens. However, other non-optical elements (e. g. spacers for keeping the interval between them) may be provided.

Figure 2:
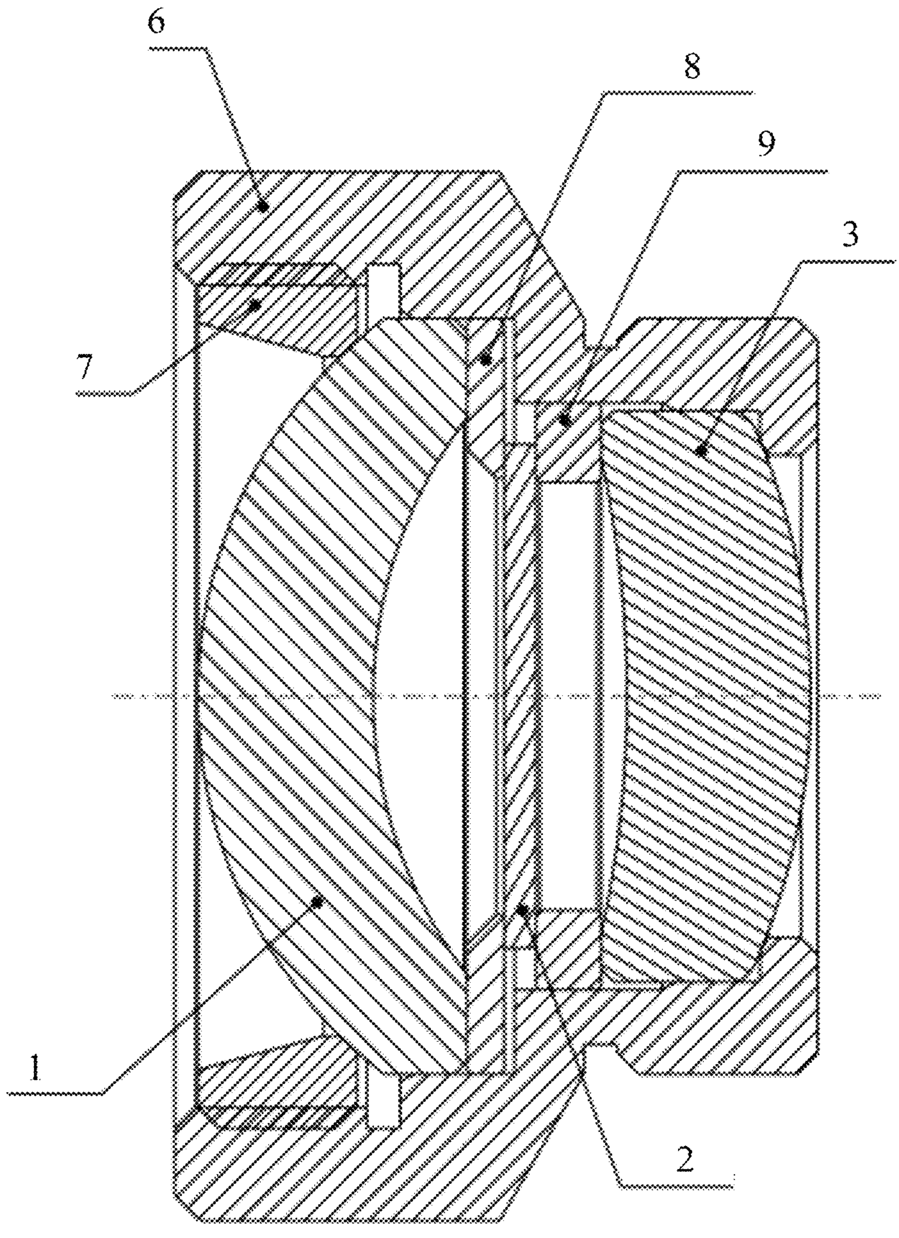
FIG. 2 shows a schematic diagram of the architectural layout of the optical system working at the far-infrared waveband in one embodiment provided by the present application.

FIG. 2 shows a schematic diagram of the architectural layout of the optical system working at the far-infrared waveband in one embodiment provided by the present application. As shown in FIG. 2, the present application also provides an optical camera working at far-infrared waveband, and the optical camera may include: a lens barrel, a pressure ring, a first disconnected ring, a second disconnected ring and the optical system.

In the optical camera, the pressure ring is set inside the lens barrel; the pressure ring is against the object-side surface of the first sulfur lens, the first disconnected ring 8 and the object-side surface of the first sulfur lens are in direct contact with each other; the first disconnected ring and the object-side surface of the metalens are in direct contact with each other; the second disconnected ring 9 and the object-side surface of the second sulfur refractive lens are in direct contact.

In the present embodiment, the optical camera further includes: an optical window glass 4 and an imaging sensor 5; the imaging sensor 5 is set on the image plane of the optical system; and the optical window glass 4 is set between the second sulfur refractive lens 3 and the imaging sensor. The optical window glass 4 is used to protect the second sulfur refractive lens 3 and the imaging sensor.

TABLE 1

Target requirements for the various system parameters of the optical system

| System Parameters | Data |
|---|---|
| TTL | ≤20 mm |
| FOV(°) | ≥31° |
| F number | ≤1.05 |
| MTF | ≥0.2 |
| Working waveband | 8-12 μm |

Table 1 shows the target requirements for the various system parameters of the optical system. In detail, the optical system is working at the far-infrared waveband, namely 8-12 μm; The TTL (total track length) of the optical system is less than or equal to 20 mm; FOV (field of view) of the optical system is greater than or equal to 31°; F number is less than or equal to 1.05. And the target requirement of MTF (modulation transfer function) of each spatial frequency at all FOV is greater than or equal to 0.2. Where MTF is an important indicator used to describe the image quality of optical system. The closer the value of MTF is to the diffraction limit, the better the image quality.

With the target requirements shown in Table 1, the present application provides six embodiments with six optical systems that meet the target requirements shown in Table 1. Next, the six optical systems provided in this application are described in detail.

Embodiment 1

Figure 3:
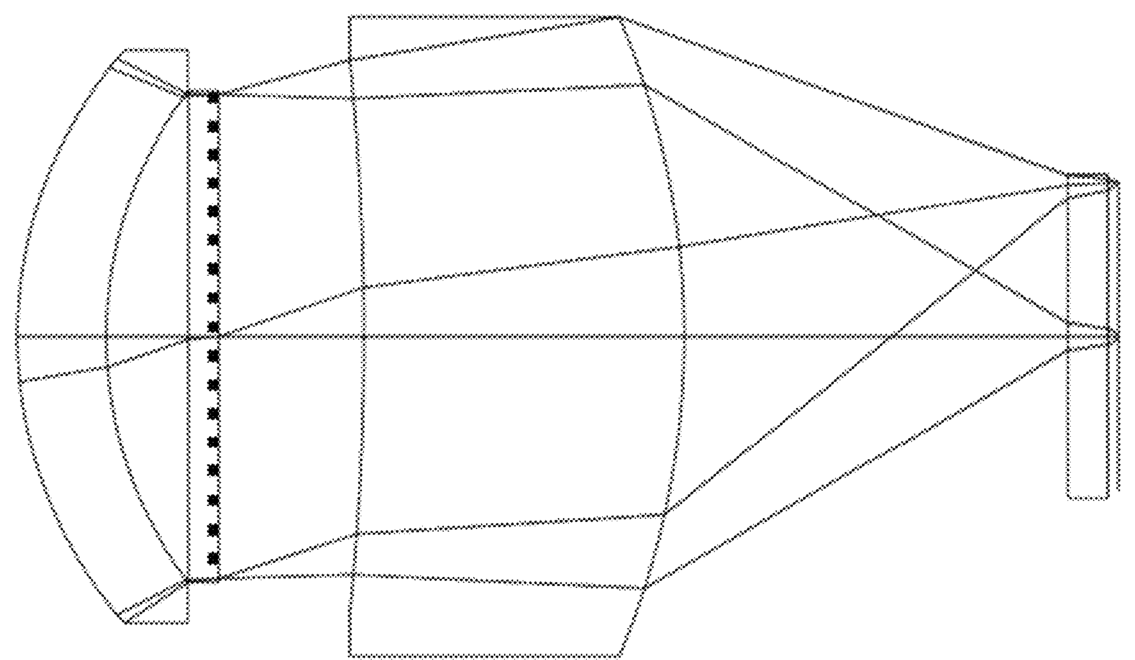
FIG. 3 shows a schematic diagram of the architectural layout of the optical system working at the far-infrared waveband in one embodiment provided by the present application.

FIG. 3 shows a schematic diagram of the architectural layout of the optical system and the optical camera working at the far-infrared waveband in one embodiment provided by the present application. As shown in FIG. 3, in embodiment 1, the optical system working at a far-infrared waveband, including three optical elements, the three optical elements being, along the optical axis in order from an object side to an image side: a first sulfur refractive lens, a metalens and a second sulfur refractive lens. The optical system further includes an optical window glass, and the optical window glass is set between the second sulfur refractive lens and the imaging sensor.

TABLE 2

The various system parameters of the optical system

| System Parameters | Data |
|---|---|
| TTL | 13.75 mm |
| FOV(2π) | 31.1° |
| F number | 1.0 |
| MTF | 7.05 |
| Working waveband | 8-12 μm |

As can be seen from the Table 2, the optical system provided by the present application works at the waveband from 8 μm to 12 μm, and has a TTL of 13.75 mm, which can fully satisfy the requirement of FOV. The F number of the optical system is 1.0, which can fully satisfy the requirements of the optical system for light intake.

Along the direction from the object side to the image side, each surface of the optical system is numbered, and after summarizing the parameters of each surface, Table 3 is obtained as shown below.

TABLE 3

Parameters of each surface from the first sulfur refractive lens to the image side

| Surface number | Type of surfaces | Curvature radius | Thickness | Material |
|---|---|---|---|---|
| 1 | Object plane | Infinite | Infinite | — |
| 2 | Spherical plane | 5.41 mm | 1.11 mm | IRG204 |
| 3 | Spherical plane | 5.06 mm | 1.03 mm | — |
| 4 | Aperture slot | Infinite | 0.375 mm | Silicon |
| 5 | Metasurface | Infinite | 1.81 mm | — |
| 6 | Even aspherical plane | −33.42 mm | 4.00 mm | IRG204 |
| 7 | Even aspherical plane | −10.09 mm | 4.80 mm | — |
| 8 | Spherical plane | Infinite | 0.5 mm | Silicon |
| 9 | Spherical plane | Infinite | 0.13 mm | — |
| 10 | Image plane | Infinite | — | — |

The surface 1 is an object plane (which hasn't been shown in FIG. 3), and the object plane is located on the left of the first sulfur refractive lens. And surface 2 is an object-side surface of the first sulfur refractive lens. The surface 3 is an image-side surface of the first sulfur refractive lens. The surface 4 is an object-side surface of the substrate of the metalens. Because in the present embodiment, the aperture slot is set on the object-side surface of the metalens, the tape of surface 4 is recorded as the aperture slot. The surface 5 is the image-side surface of the metalens, due to the nanostructures being set on the image-side surface of the metalens in the present embodiment, the type of surface 5 is recorded as a metasurface. The surface 6 is the image-side surface of the second sulfur refractive lens. The surface 7 is the image-side surface of the second sulfur refractive lens. The surface 8 is the object-side surface of the optical window glass. The surface 9 is the image-side surface. And the surface 10 is the image-side surface.

It can be seen from Table 3 that the curvature radius of surface 1 is infinite (namely, surface 1 is a plane), and the distance between the surface 1 and surface 2 is uncertain. The surface 2 is a spherical plane with the curvature radius of 5.41 mm. The distance between the surface 2 and the surface 3 is 1.11 mm, and the first sulfur refractive lens is made of sulfur glass of IRG204. The surface 3 is a special plane with the curvature radius of 5.06 mm, and the distance between the surface 3 and surface 4 is 1.033 mm, and air is filled between the surface 3 and surface 4. The surface 4 is a plane, and the distance between the surface 4 and surface 5 is 0.375 mm, and the metalens is made of silicon, including the intrinsic silicon, optical silicon, crystalline silicon, amorphous silicon and extrinsic silicon. The surface 5 is a plane, and the distance between the surface 6 and surface 5 is 1.81 mm, and air is filled between the surface 5 and surface 6. The surface 6 is an even aspherical plane with the curvature radius of −33.42 mm. And the distance between the surface 6 and surface 7 is 4.00 mm, and the second sulfur refractive lens is made of sulfur glass of IRG204. The surface 7 is an even aspherical plane with the curvature radius of −10.09 mm. And the distance between the surface 7 and surface 8 is 4.80 mm, and air is filled between the surface 7 and surface 8. The surface 8 is a plane, and the distance between the surface 8 and surface 9 is 0.5 mm, and the optical window glass is made of silicon, including intrinsic silicon, optical silicon, crystalline silicon, amorphous silicon and extrinsic silicon. The surface 9 is a plane, and the distance between the surface 9 and surface 10 is 0.13 mm. And air is filled between the surface 9 and surface 10.

Figure 4:
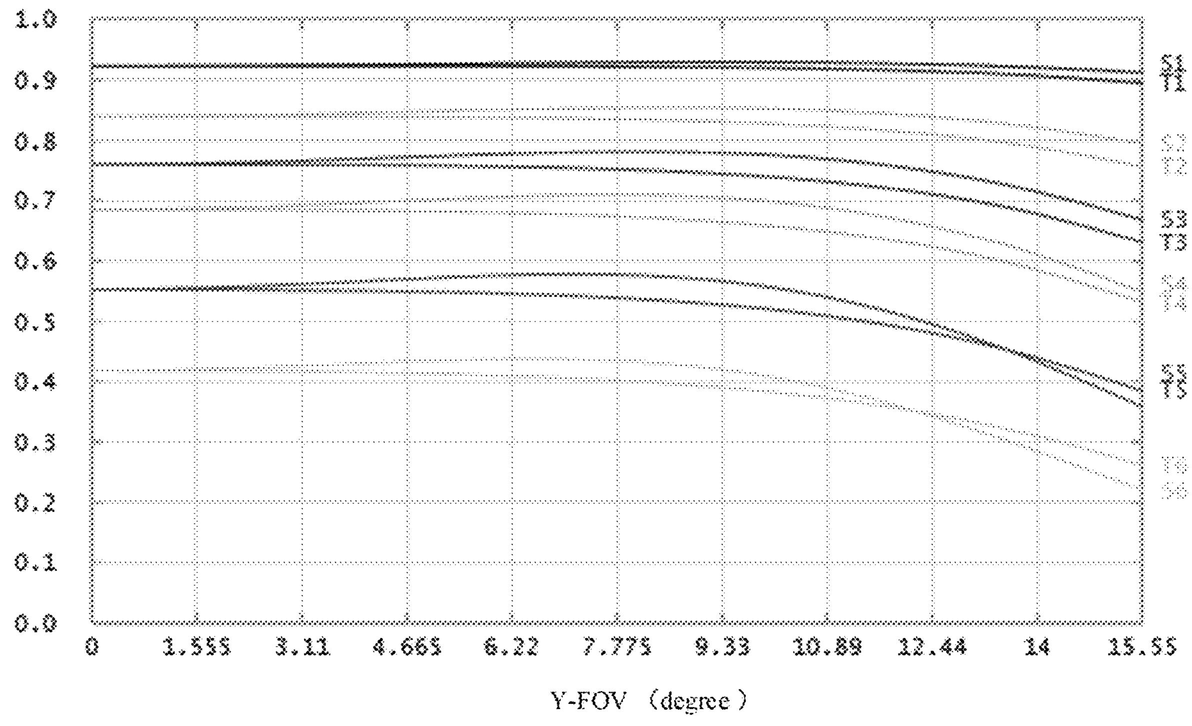
FIG. 4 shows a curve diagram at room temperature between the MTF and field of view of the optical system working at the far-infrared waveband in one embodiment provided by the present application.
Figure 5:
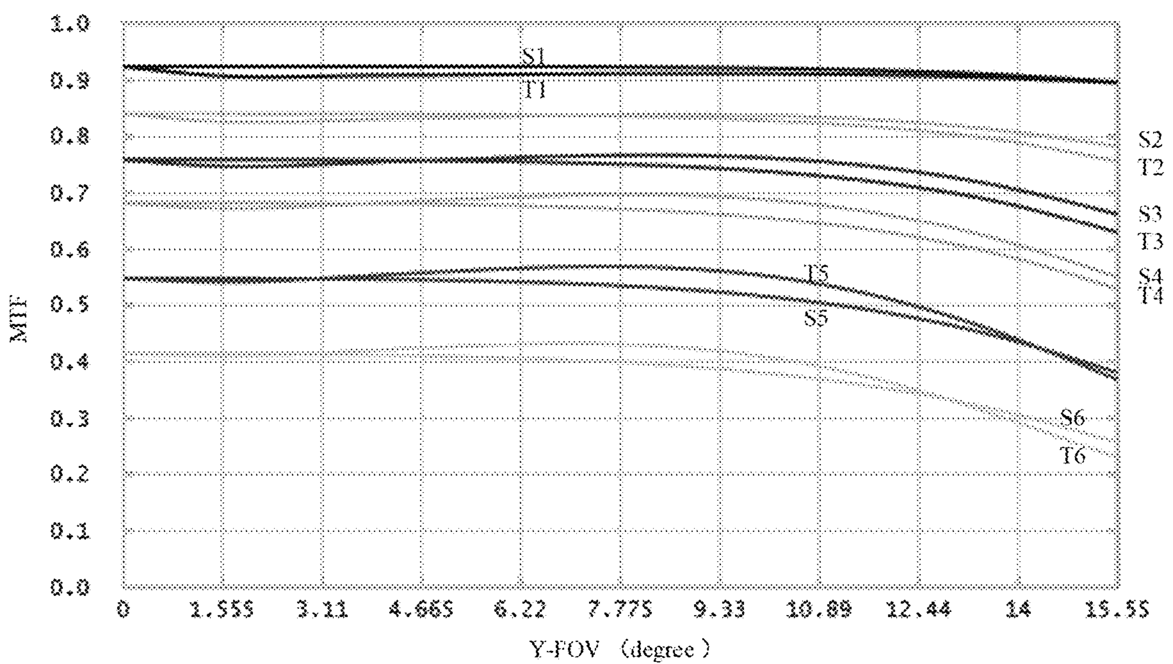
FIG. 5 shows a curve diagram at the temperature of −40° C. between the MTF and field of view of the optical system working at the far-infrared waveband in one embodiment provided by the present application.
Figure 6:
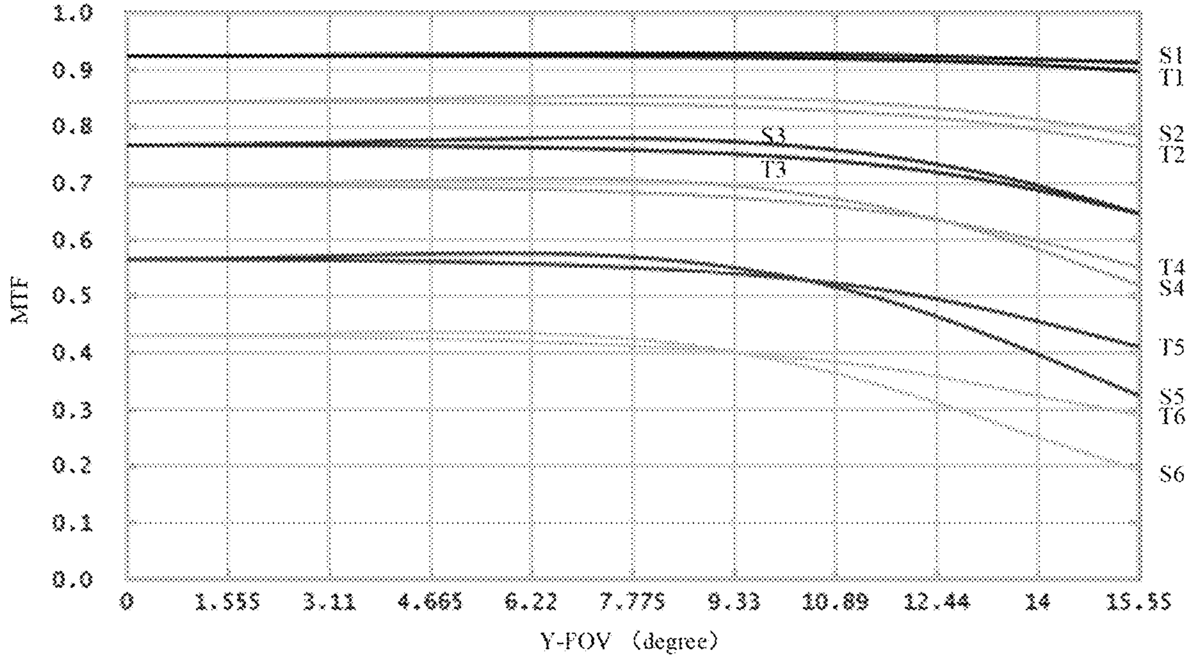
FIG. 6 shows a curve diagram at the temperature of 80° C. between the MTF and field of view of the optical system working at the far-infrared waveband in one embodiment provided by the present application.

FIG. 4 shows a curve diagram at room temperature between the MTF and field of view of the optical system working at the far-infrared waveband in embodiment 1 provided by the present application. In general, the room temperature refers to the environment of 25° C. FIG. 5 shows a curve diagram at the temperature of −40° C. between the MTF and field of view of the optical system working at the far-infrared waveband in embodiment 1 provided by the present application. FIG. 6 shows a curve diagram at the temperature of 80° C. between the MTF and field of view of the optical system working at the far-infrared waveband in embodiment 1 provided by the present application.

From FIG. 4 to FIG. 6, the horizontal axis represents the field of view on the Y axis with a unit of degree; the vertical axis represents the MTF value; and T represents the meridional direction curve and S is the sagittal direction curve. Specifically, the meridional curve T1 and sagittal curve S1 correspond to the spatial frequency of 5.00 (cyc/mm); the meridional curve T2 and sagittal curve S2 correspond to the spatial frequency of 10.00 (cyc/mm); the meridional curve T3 and sagittal curve S3 correspond to the spatial frequency of 15.00 (cyc/mm); the meridional curve T4 and sagittal curve S4 correspond to the spatial frequency of 20.00 (cyc/mm); the meridional curve T5 and sagittal curve S5 correspond to the spatial frequency of 40.00 (cyc/mm); the meridional curve T6 and sagittal curve S6 correspond to the spatial frequency of 42.00 (cyc/mm).

As shown in FIG. 4, the optical system provided by the present application at room temperature has an MTF of each spatial frequency greater than 0.2 at all fields of view, which indicates that image quality of the optical system at room temperature is good. From FIG. 5 can be seen, the optical system provided by the present application, the MTF of each spatial frequency is greater than 0.2 at the temperature of −40° C. at all fields of view, which indicates that image quality of the optical system at the temperature of −40° C. is good. From FIG. 5 can be seen, the optical system provided by the present application, the MTF of each spatial frequency is greater than 0.2 at the temperature of 80° C. at all fields of view, which indicates that image quality of the optical system at the temperature of 80° C. is good.

From FIG. 4 to FIG. 6, the optical system provided by the present application at the temperature from −40° C. to 80° C. keeps good image quality all the time, which indicates that the optical system has fully realized the athermalization.

Figure 7:
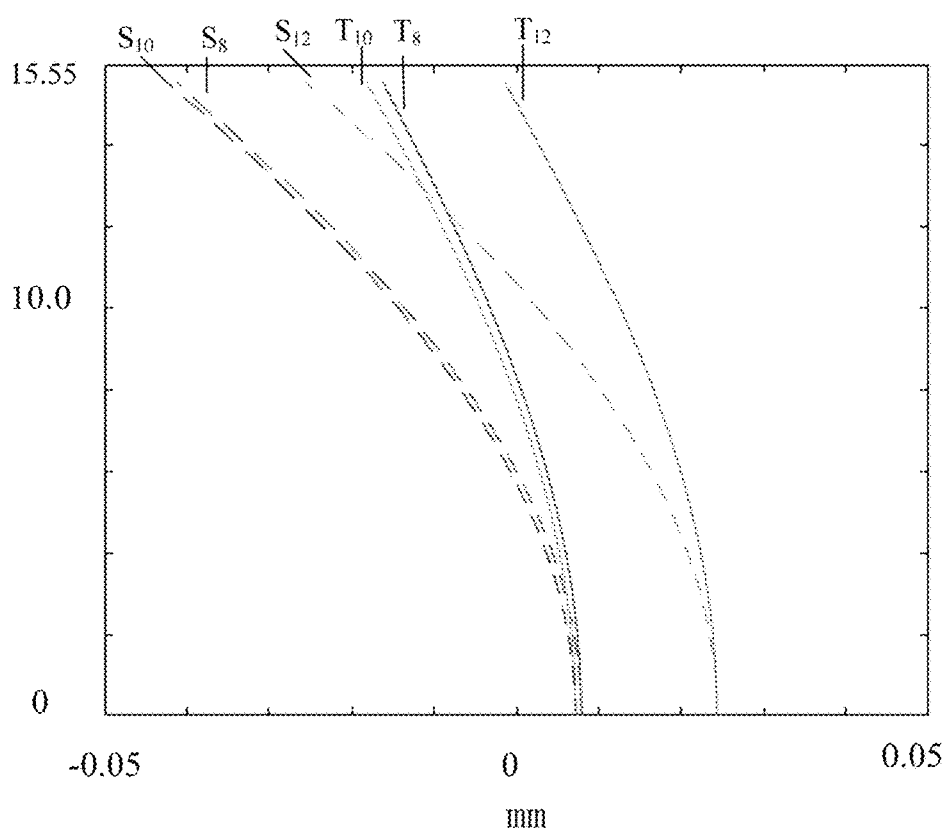
FIG. 7 shows a field curvature diagram of the optical system working at the far-infrared waveband in one embodiment provided by the present application.

FIG. 7 shows a field curvature diagram of the optical system working at the far-infrared waveband in one embodiment provided by the present application. In FIG. 7, the horizontal axis represents the offset distance between the actual focus and the image plane with a unit of millimeter; the vertical axis represents the field of view in the positive direction along the Y axis, and the unit of field of view is degree. In FIG. 7, T represents the meridional curve, and S represents the sagittal curve. Specifically, the meridional curve $T_8$ and the sagittal curve $S_8$ correspond to the working wavelength of 8 μm; and the meridional curve $T_{10}$ and the sagittal curve $S_{10}$ correspond to the working wavelength of 10 μm; and the meridional curve $T_{12}$ and the sagittal curve $S_{12}$ correspond to the working wavelength of 12 μm.

It can be seen from FIG. 7 that the field curvature is less than 0.05 mm at the wavelengths from 8 μm to 12 μm, which indicates that the field curvature of the optical system is small.

Figure 8:
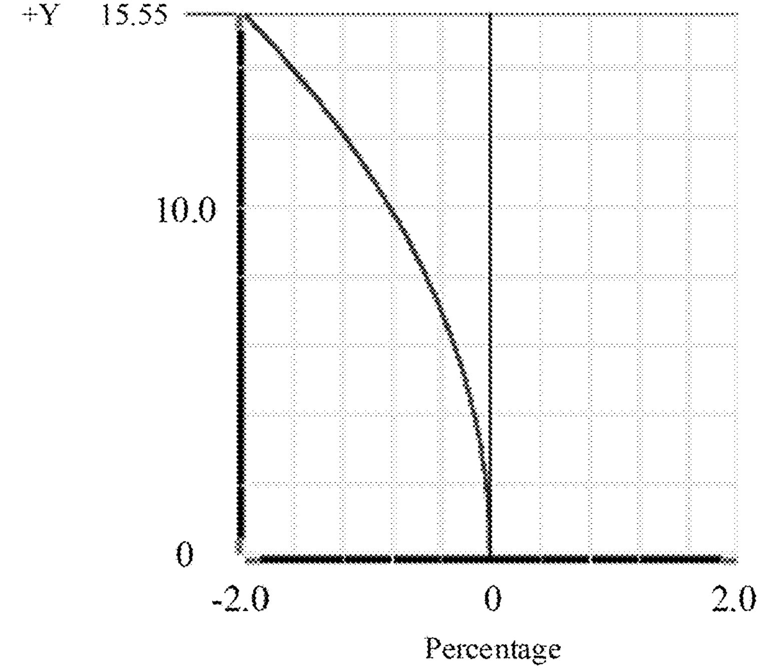
FIG. 8 shows a distortion diagram of the optical system working at the far-infrared waveband in one embodiment provided by the present application.

FIG. 8 shows a distortion diagram of the optical system working at the far-infrared waveband in one embodiment provided by the present application. In FIG. 8, the horizontal axis represents the degree of the distortion of imaging and the unit of degree of the distortion is percentage; the vertical axis represents the field of view in the positive direction along the Y axis, and the unit of field of view is degree. FIG. 8 shows the distortion curve at wavelength of 8 μm, the distortion curve at wavelength of 10 μm and the distortion curve at wavelength of 12 μm. And the three curves are almost completely overlapping.

It can be seen from FIG. 8 that in the present application the distortions corresponding to each wavelength from 8 μm to 12 μm is less than 2.0%, which indicates that the distortion of the optical system is small.

Embodiment 2

Figure 9:
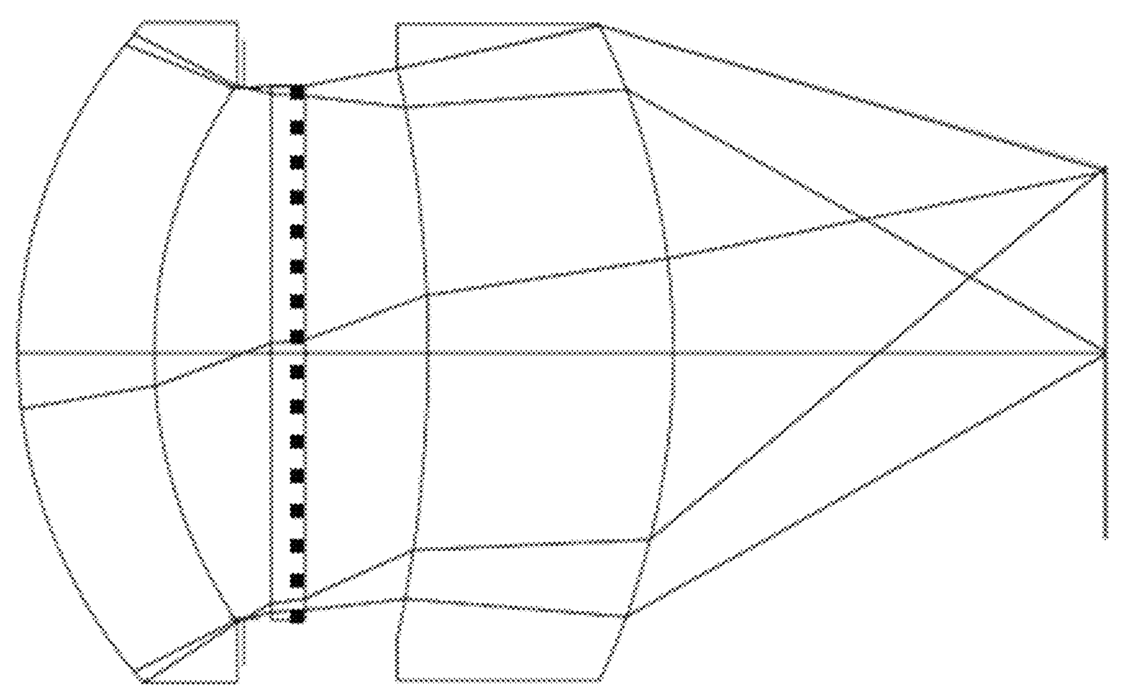
FIG. 9 shows a schematic diagram of the architectural layout of the optical system working at the far-infrared waveband in one embodiment provided by the present application.

FIG. 9 shows a schematic diagram of the architectural layout of the optical system and the optical camera working at the far-infrared waveband in embodiment 2 provided by the present application. As shown in FIG. 9, in embodiment 1, the optical system working at a far-infrared waveband, including three optical elements, the three optical elements being, along the optical axis in order from an object side to an image side: a first sulfur refractive lens, a metalens and a second sulfur refractive lens. The optical system further includes an optical window glass, and the optical window glass is set between the second sulfur refractive lens and the imaging sensor.

TABLE 4

The various system parameters of the optical system

| System Parameters | Data |
|---|---|
| TTL | 11.82 mm |
| FOV(2π) | 31° |
| F number | 1.0 |
| MTF | 7.02 |
| Working waveband | 8-12 μm |

As can be seen from the Table 4, the optical system provided by the present application works at the waveband from 8 μm to 12 μm, and has a TTL of 11.82 mm and a FOV of 31°. The F number of the optical system is 1.0, which can fully satisfy the requirements of the optical system for the light intake.

Along the direction from the object side to the image side, each surface of the optical system is numbered, and after summarizing the parameters of each surface, Table 5 is obtained as shown below.

TABLE 5

Parameters of each surface from the first sulfur refractive lens to the image side

| Surface number | Type of surfaces | Curvature radius | Thickness | Material |
|---|---|---|---|---|
| 1 | Object plane | Infinite | Infinite | — |
| 2 | Spherical plane | 5.34 mm | 1.48 mm | IRG204 |
| 3 | Spherical plane | 5.12 mm | 0.98 mm | — |
| 4 | Aperture slot | Infinite | 0.29 mm | Silicon |
| 5 | Spherical plane | Infinite | 0.375 mm | — |
| 6 | Metasurface | Infinite | 1.34 mm | IRG204 |
| 7 | Spherical plane | −14.38 mm | 2.67 mm | — |
| 8 | Spherical plane | −8.19 mm | 4.70 mm | — |
| 9 | Image plane | Infinite | — | — |

The explanation of Table 5 refers to the explanation of Table 3, and will not repeat here.

Figure 10:
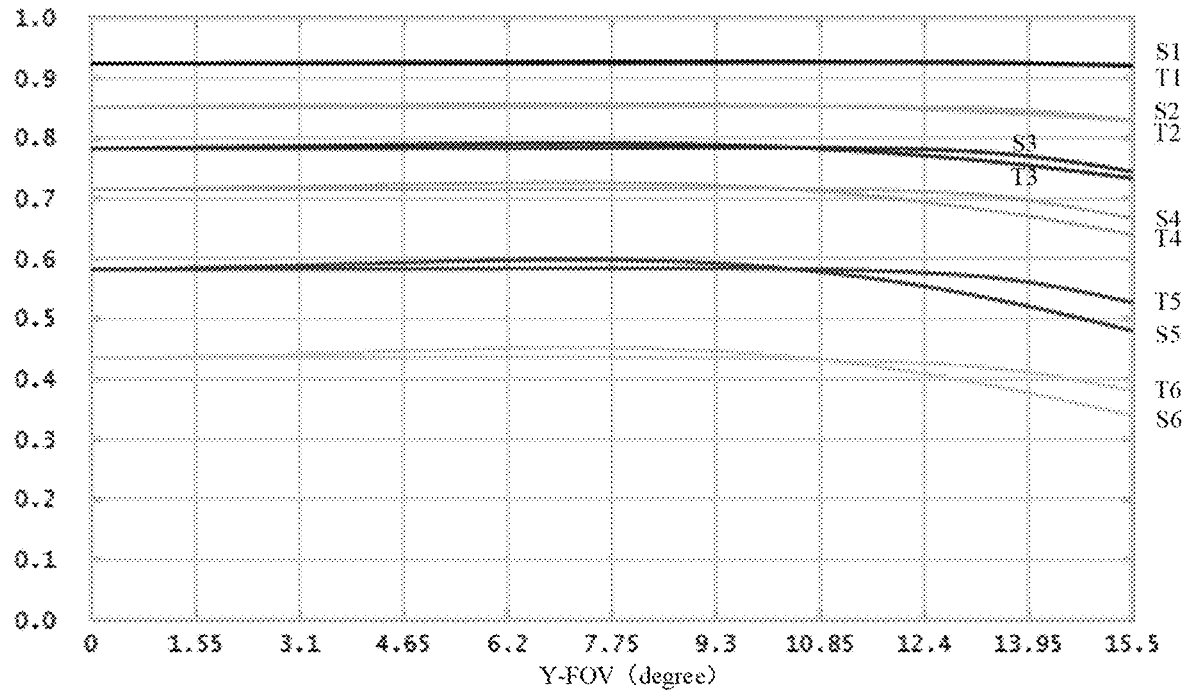
FIG. 10 shows a curve diagram at room temperature between the MTF and field of view of the optical system working at the far-infrared waveband in one embodiment provided by the present application.
Figure 11:
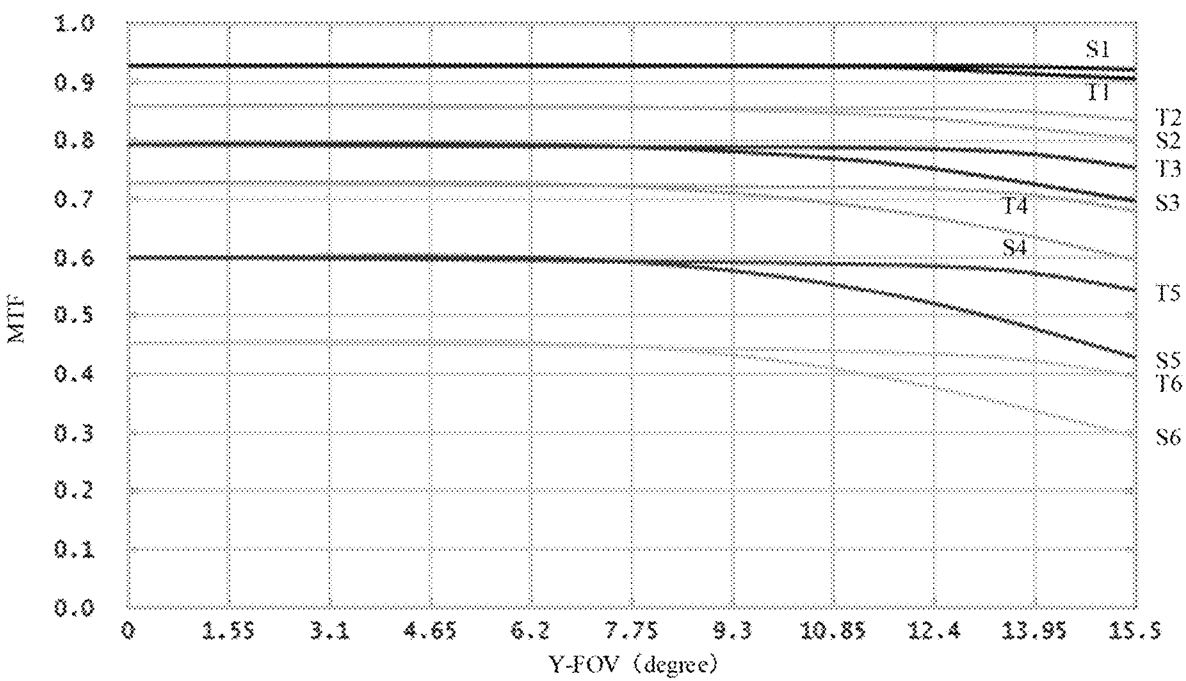
FIG. 11 shows a curve diagram at the temperature of −40° C. between the MTF and field of view of the optical system working at the far-infrared waveband in one embodiment provided by the present application.
Figure 12:
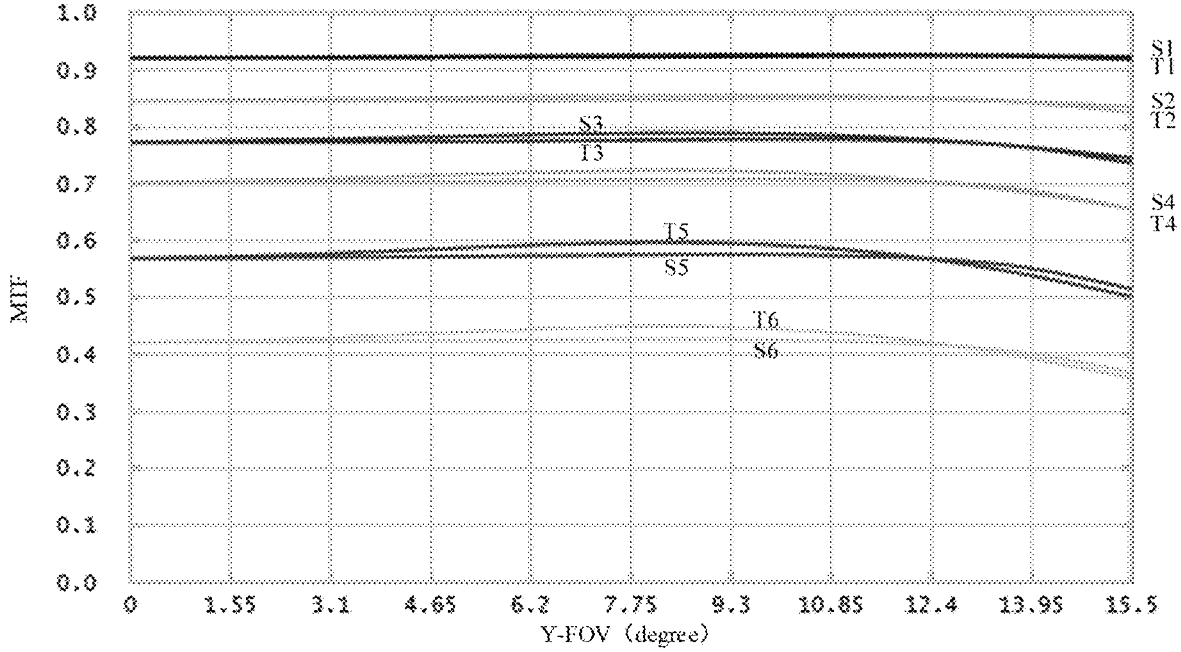
FIG. 12 shows a curve diagram at the temperature of 80° C. between the MTF and field of view of the optical system working at the far-infrared waveband in one embodiment provided by the present application.

FIG. 10 shows a curve diagram at room temperature between the MTF and field of view of the optical system working at the far-infrared waveband in embodiment 2 provided by the present application. In general, the room temperature refers to the environment of 25° C. FIG. 11 shows a curve diagram at the temperature of −40° C. between the MTF and field of view of the optical system working at the far-infrared waveband in embodiment 2 provided by the present application. FIG. 12 shows a curve diagram at the temperature of 80° C. between the MTF and field of view of the optical system working at the far-infrared waveband in embodiment 2 provided by the present application.

From FIG. 10 to FIG. 12, the horizontal axis represents the field of view on the Y axis with a unit of degree; the vertical axis represents the MTF value; and T represents the meridional direction curve and S is the sagittal direction curve. Specifically, the meridional curve T1 and sagittal curve S1 correspond to the spatial frequency of 5.00 (cyc/mm); the meridional curve T2 and sagittal curve S2 correspond to the spatial frequency of 10.00 (cyc/mm); the meridional curve T3 and sagittal curve S3 correspond to the spatial frequency of 15.00 (cyc/mm); the meridional curve T4 and sagittal curve S4 correspond to the spatial frequency of 20.00 (cyc/mm); the meridional curve T5 and sagittal curve S5 correspond to the spatial frequency of 40.00 (cyc/mm); the meridional curve T6 and sagittal curve S6 correspond to the spatial frequency of 42.00 (cyc/mm).

As shown in FIG. 10, the optical system provided by the present application at room temperature the MTF of each spatial frequency is greater than 0.32 at all fields of view, which indicates that image quality of the optical system at room temperature is good. It can be seen from FIG. 11 that the optical system provided by the present application, the MTF of each spatial frequency is greater than 0.28 at the temperature of −40° C. at all fields of view, which indicates that image quality of the optical system at the temperature of −40° C. is good. It can be seen from FIG. 12 that the optical system provided by the present application, the MTF of each spatial frequency is greater than 0.34 at the temperature of 80° C. at all fields of view, which indicates that image quality of the optical system at the temperature of 80° C. is good.

From FIG. 10 to FIG. 12, the optical system provided by the present application at the temperature from −40° C. to 80° C. keeps good image quality all the time, which indicates the optical system has fully realized the athermalization.

Figure 13:
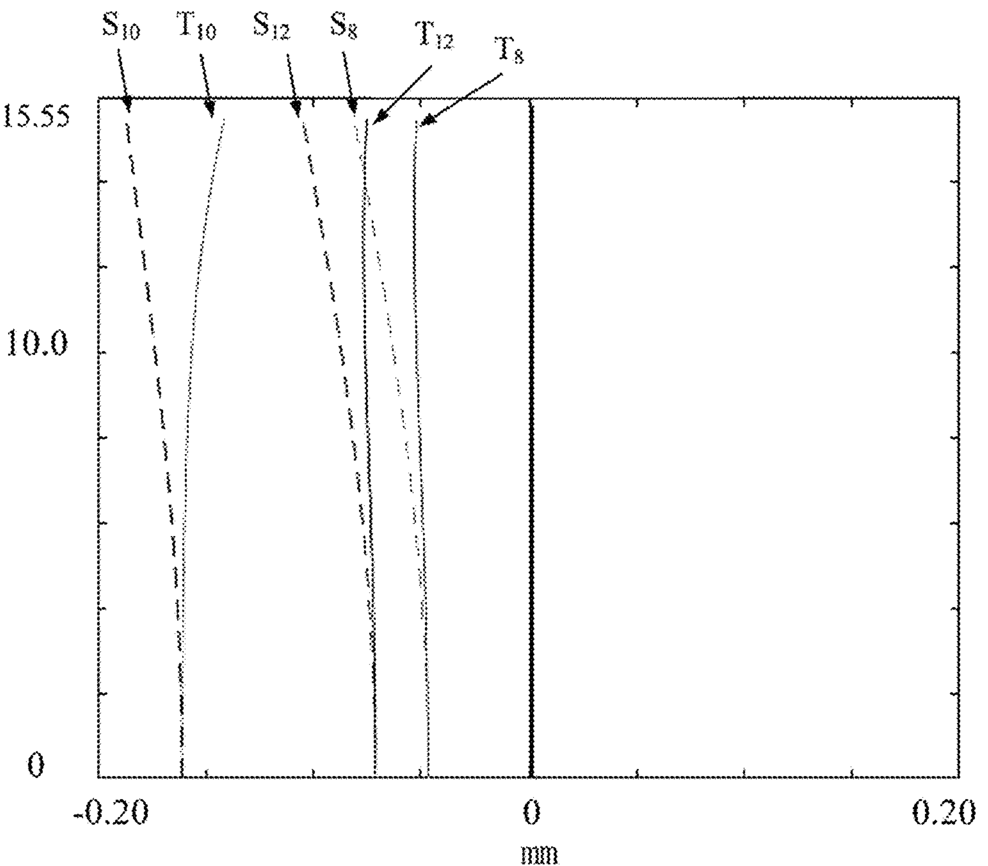
FIG. 13 shows a field curvature diagram of the optical system working at the far-infrared waveband in one embodiment provided by the present application.

FIG. 13 shows a field curvature diagram of the optical system working at the far-infrared waveband in embodiment 2 provided by the present application. In FIG. 13, the horizontal axis represents the offset distance between the actual focus and the image plane and the unit of offset distance is millimeter; the vertical axis represents the field of view in the positive direction along the Y axis, and the unit of field of view is degree. In FIG. 13, T represents the meridional curve, and S represents the sagittal curve. Specifically, the meridional curve $T_8$ and the sagittal curve $S_8$ correspond to the working wavelength of 8 μm; and the meridional curve $T_{10}$ and the sagittal curve $S_{10}$ correspond to the working wavelength of 10 μm; and the meridional curve $T_{12}$ and the sagittal curve $S_{12}$ correspond to the working wavelength of 12 μm.

It can be seen from FIG. 13 that the field curvature is less than 0.02 mm at the wavelengths from 8 μm to 12 μm, which indicates that the field curvature of the optical system is small.

Figure 14:
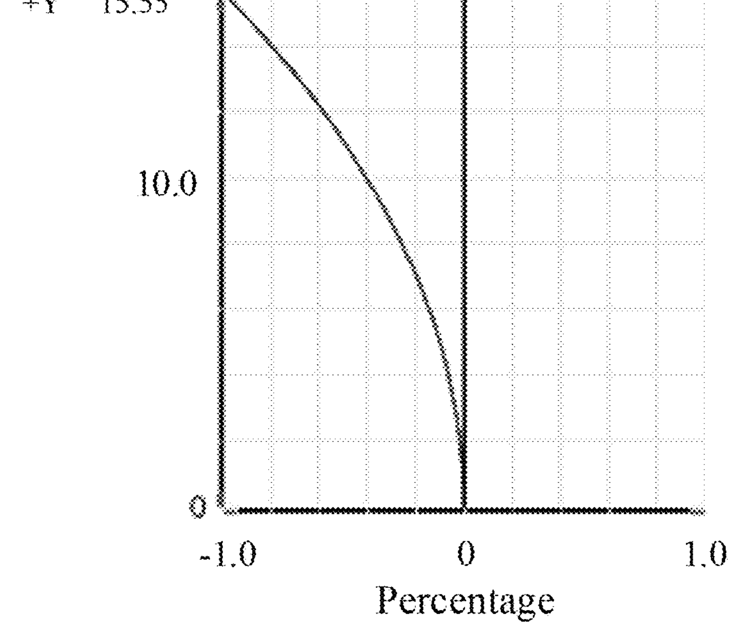
FIG. 14 shows a distortion diagram of the optical system working at the far-infrared waveband in one embodiment provided by the present application.

FIG. 14 shows a distortion diagram of the optical system working at the far-infrared waveband in one embodiment provided by the present application. In FIG. 14, the horizontal axis represents the degree of the distortion of imaging and the unit of degree of the distortion is percentage; the vertical axis represents the field of view in the positive direction along the Y axis, and the unit of field of view is degree. FIG. 14 shows the distortion curve at wavelength of 8 μm, the distortion curve at wavelength of 10 μm and the distortion curve at wavelength of 12 μm. And the three curves are almost completely overlapping.

It can be seen from FIG. 14 that in the present application, the distortions corresponding to each wavelength from 8 μm to 12 μm is less than 1.0%, which indicates that the distortion of the optical system is small.

Embodiment 3

Figure 15:
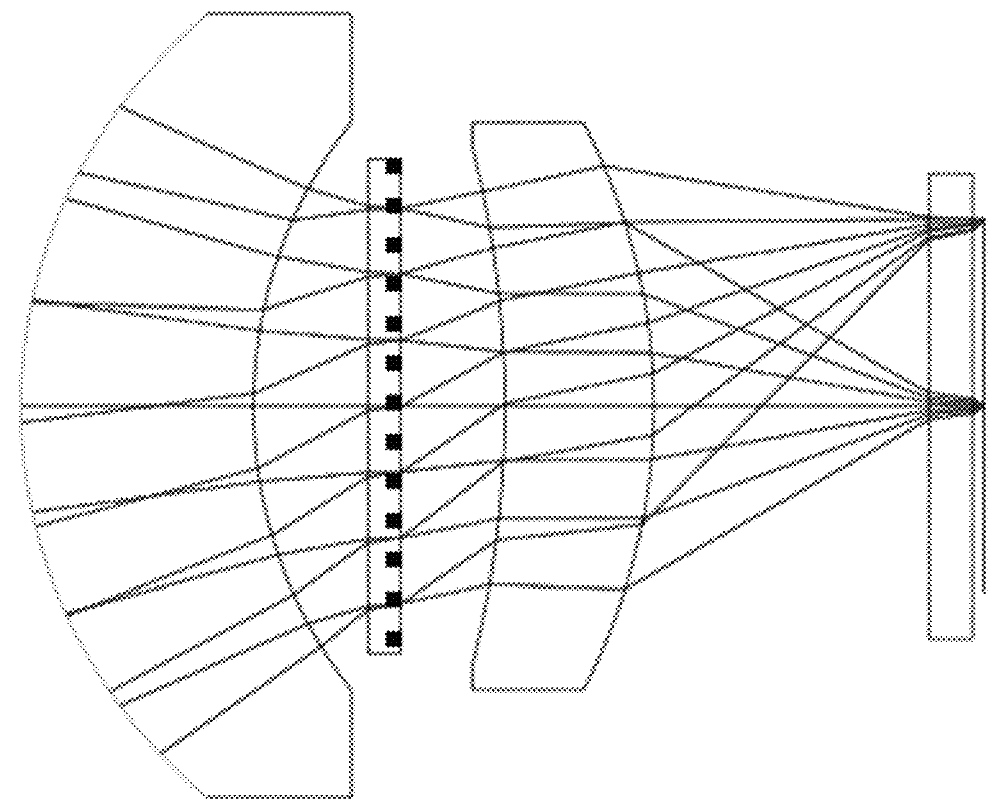
FIG. 15 shows a schematic diagram of the architectural layout of the optical system working at the far-infrared waveband in one embodiment provided by the present application.

FIG. 15 shows a schematic diagram of the architectural layout of the optical system and the optical camera working at the far-infrared waveband in embodiment 3 provided by the present application. As shown in FIG. 15, in embodiment 3, the optical system working at a far-infrared waveband, including three optical elements, the three optical elements being, along the optical axis in order from an object side to an image side: a first sulfur refractive lens, a metalens and a second sulfur refractive lens. The optical system further includes an optical window glass, and the optical window glass is set between the second sulfur refractive lens and the imaging sensor.

TABLE 6

The various system parameters of the optical system of embodiment 3

| System Parameters | Data |
|---|---|
| TTL | 10.92 mm |
| FOV(2ω) | 34° |
| F number | 1.0 |
| Effective focal length | 6.87 mm |
| Working waveband | 8-12 μm |

As can be seen from the Table 6, the optical system provided by the present application works at the waveband from 8 μm to 12 μm, and has a TTL of 10.92 mm and a FOV of 34°. The F number of the optical system is 1.0, which can fully satisfy the requirements of the optical system for the light intake.

Along the direction from the object side to the image side, each surface of the optical system is numbered, and after summarizing the parameters of each surface, Table 7 is obtained as shown below.

TABLE 7

Parameters of each surface from the first sulfur refractive lens to the image side of embodiment 3

| Surface number | Type of surfaces | Curvature radius | Thickness | Material |
|---|---|---|---|---|
| 1 | Object plane | Infinite | Infinite | — |
| 2 | Spherical plane | 5.85 mm | 2.63 mm | IRG206 |
| 3 | Spherical plane | 5.33 mm | 1.29 mm | — |
| 4 | Spherical plane | Infinite | 0.375 mm | Silicon |
| 5 | Metasurface(Aperture slot) | Infinite | 1.81 mm | — |
| 6 | Spherical plane | −12.12 mm | 1.68 mm | IRG206 |

TABLE 7-continued

| Parameters of each surface from the first sulfur refractive lens to the image side of embodiment 3 | | | | |
|---|---|---|---|---|
| Surface number | Type of surfaces | Curvature radius | Thickness | Material |
| 7 | Spherical plane | −7.09 mm | 3.12 mm | — |
| 8 | Spherical plane | Infinite | 0.5 mm | Silicon |
| 9 | Spherical plane | Infinite | 0.13 mm | — |
| 10 | Image plane | Infinite | — | — |

The explanation of Table 7 refers to the explanation of Table 3, and will not repeat here.

Figure 16:
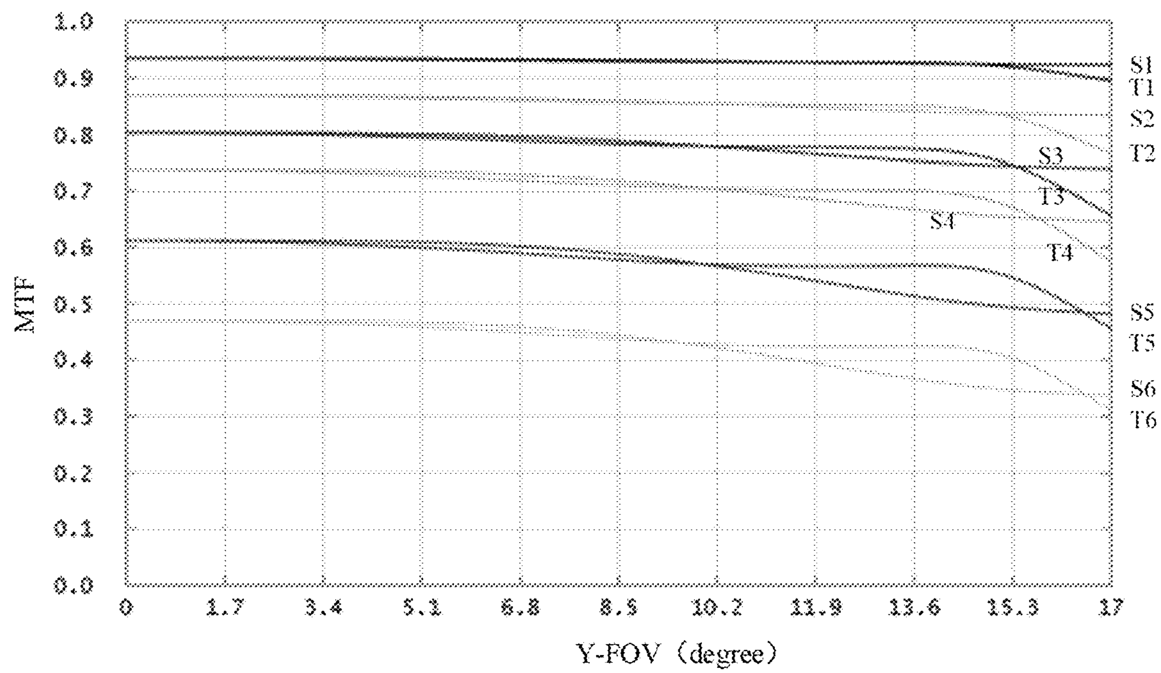
FIG. 16 shows a curve diagram at room temperature between the MTF and field of view of the optical system working at the far-infrared waveband in one embodiment provided by the present application.
Figure 17:
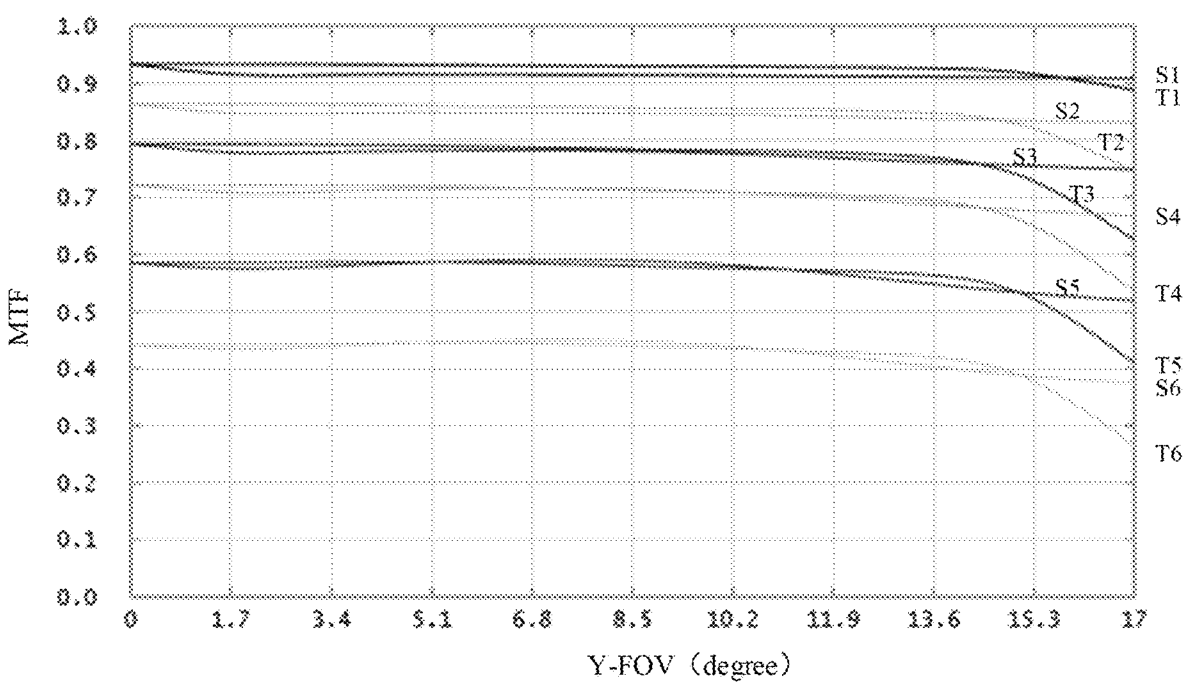
FIG. 17 shows a curve diagram at the temperature of −40° C. between the MTF and field of view of the optical system working at the far-infrared waveband in one embodiment provided by the present application.
Figure 18:
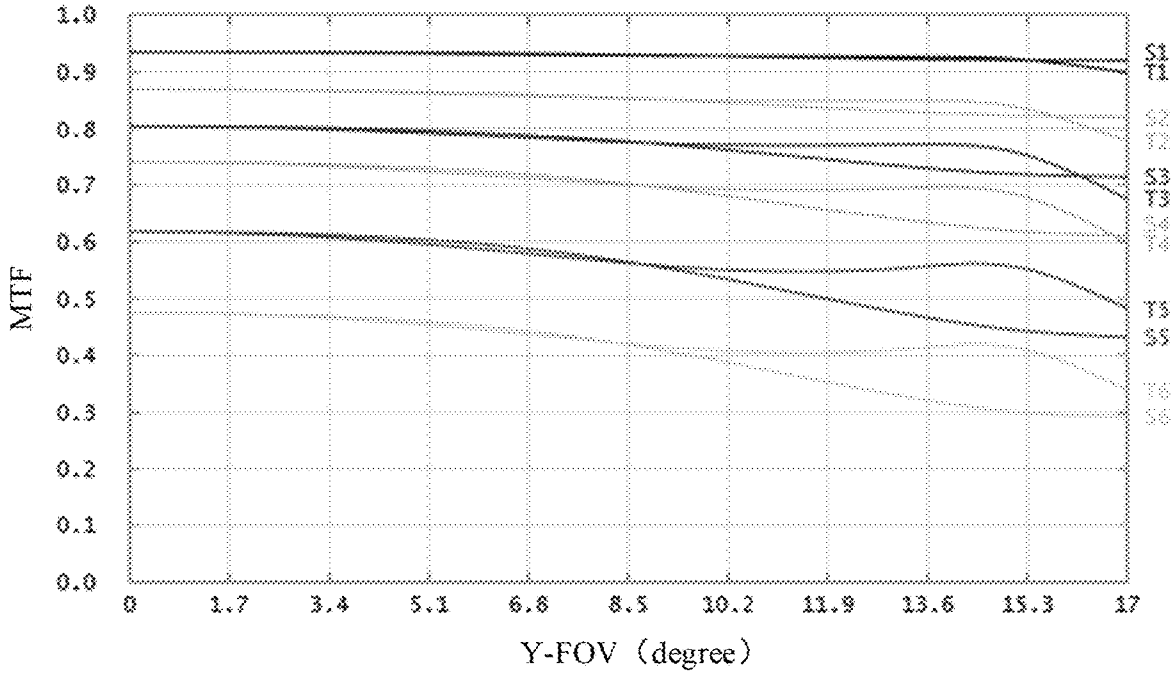
FIG. 18 shows a curve diagram at the temperature of 80° C. between the MTF and field of view of the optical system working at the far-infrared waveband in one embodiment provided by the present application.

FIG. 16 shows a curve diagram at room temperature between the MTF and field of view of the optical system working at the far-infrared waveband in embodiment 3 provided by the present application. In general, the room temperature refers to the environment of 25° C. FIG. 17 shows a curve diagram at the temperature of −40° C. between the MTF and field of view of the optical system working at the far-infrared waveband in embodiment 3 provided by the present application. FIG. 18 shows a curve diagram at the temperature of 80° C. between the MTF and field of view of the optical system working at the far-infrared waveband in embodiment 3 provided by the present application.

From FIG. 16 to FIG. 18, the horizontal axis represents the field of view on the Y axis with a unit of degree; the vertical axis represents the MTF value; and T represents the meridional direction curve and S is the sagittal direction curve. Specifically, the meridional curve T1 and sagittal curve S1 correspond to the spatial frequency of 5.00 (cyc/mm); the meridional curve T2 and sagittal curve S2 correspond to the spatial frequency of 10.00 (cyc/mm); the meridional curve T3 and sagittal curve S3 correspond to the spatial frequency of 15.00 (cyc/mm); the meridional curve T4 and sagittal curve S4 correspond to the spatial frequency of 20.00 (cyc/mm); the meridional curve T5 and sagittal curve S5 correspond to the spatial frequency of 40.00 (cyc/mm); the meridional curve T6 and sagittal curve S6 correspond to the spatial frequency of 42.00 (cyc/mm).

As shown in FIG. 16, the optical system provided by the present application at room temperature the MTF of each spatial frequency is greater than 0.3 at all fields of view, which indicates that image quality of the optical system at room temperature is good. It can be seen from FIG. 17 that the optical system provided by the present application, the MTF of each spatial frequency is greater than 0.25 at the temperature of −40° C. at all fields of view, which indicates that image quality of the optical system at the temperature of −40° C. is good. It can be seen from FIG. 18 that the optical system provided by the present application, the MTF of each spatial frequency is greater than 0.3 at the temperature of 80° C. at all fields of view, which indicates that image quality of the optical system at the temperature of 80° C. is good.

From FIG. 16 to FIG. 18, the optical system provided by the present application at the temperature from −40° C. to 80° C. keeps good image quality all the time, which indicates the optical system has fully realized the athermalization.

Figure 19:
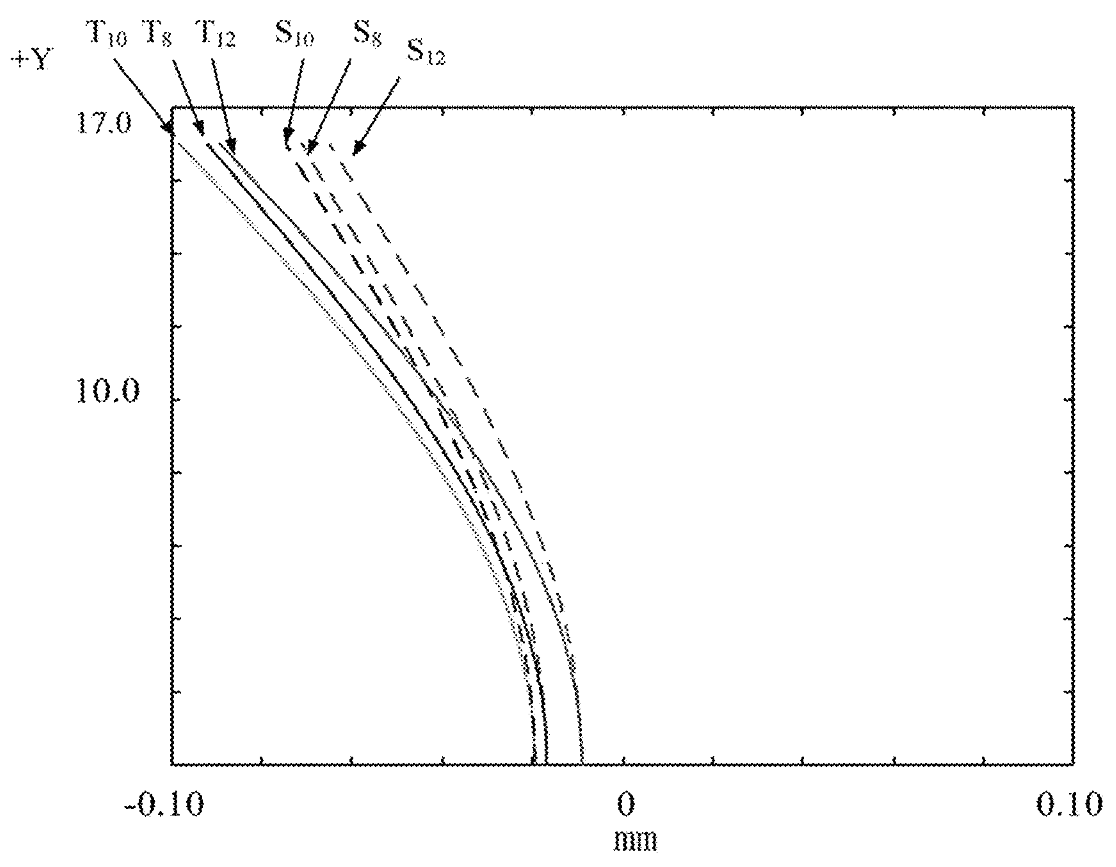
FIG. 19 shows a field curvature diagram of the optical system working at the far-infrared waveband in one embodiment provided by the present application.

FIG. 19 shows a field curvature diagram of the optical system working at the far-infrared waveband in embodiment 3 provided by the present application. In FIG. 19, the horizontal axis represents the offset distance between the actual focus and the image plane and the unit of offset distance is millimeter; the vertical axis represents the field of view in the positive direction along the Y axis, and the unit of field of view is degree. In FIG. 19, T represents the meridional curve, and S represents the sagittal curve. Specifically, the meridional curve $T_8$ and the sagittal curve $S_8$ correspond to the working wavelength of 8 μm; and the meridional curve $T_{10}$ and the sagittal curve $S_{10}$ correspond to the working wavelength of 10 μm; and the meridional curve $T_{12}$ and the sagittal curve $S_{12}$ correspond to the working wavelength of 12 μm.

It can be seen from FIG. 19 that the field curvature is less than 0.09 mm at the wavelengths from 8 μm to 12 μm, which indicates that the field curvature of the optical system is small.

Figure 20:
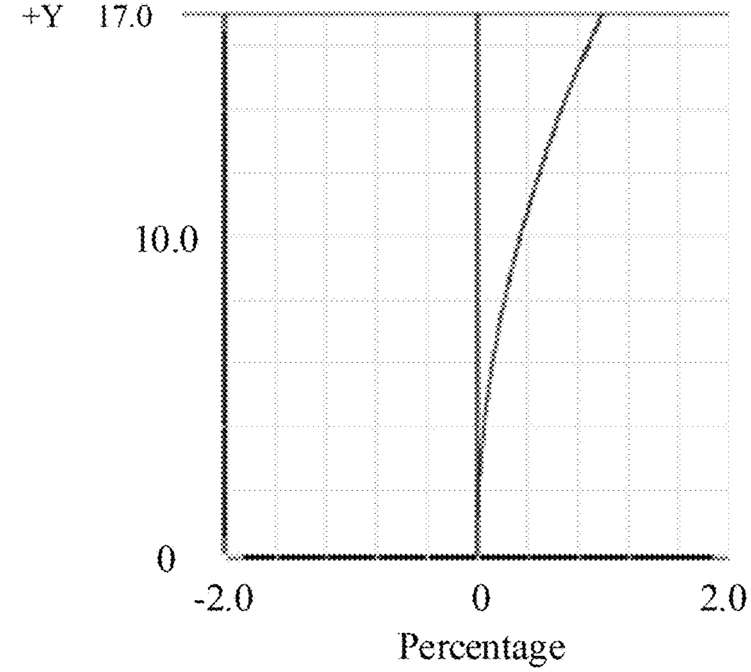
FIG. 20 shows a distortion diagram of the optical system working at the far-infrared waveband in one embodiment provided by the present application.

FIG. 20 shows a distortion diagram of the optical system working at the far-infrared waveband in one embodiment provided by the present application. In FIG. 20, the horizontal axis represents the degree of the distortion of imaging and the unit of degree of the distortion is percentage; the vertical axis represents the field of view in the positive direction along the Y axis, and the unit of field of view is degree. FIG. 20 shows the distortion curve at wavelength of 8 μm, the distortion curve at wavelength of 10 μm and the distortion curve at wavelength of 12 μm. And the three curves are almost completely overlapping.

It can be seen from FIG. 20 that in the present application the distortions corresponding to each wavelength from 8 μm to 12 μm is less than 1.2%, which indicates that the distortion of the optical system is small.

Embodiment 4

Figure 21:
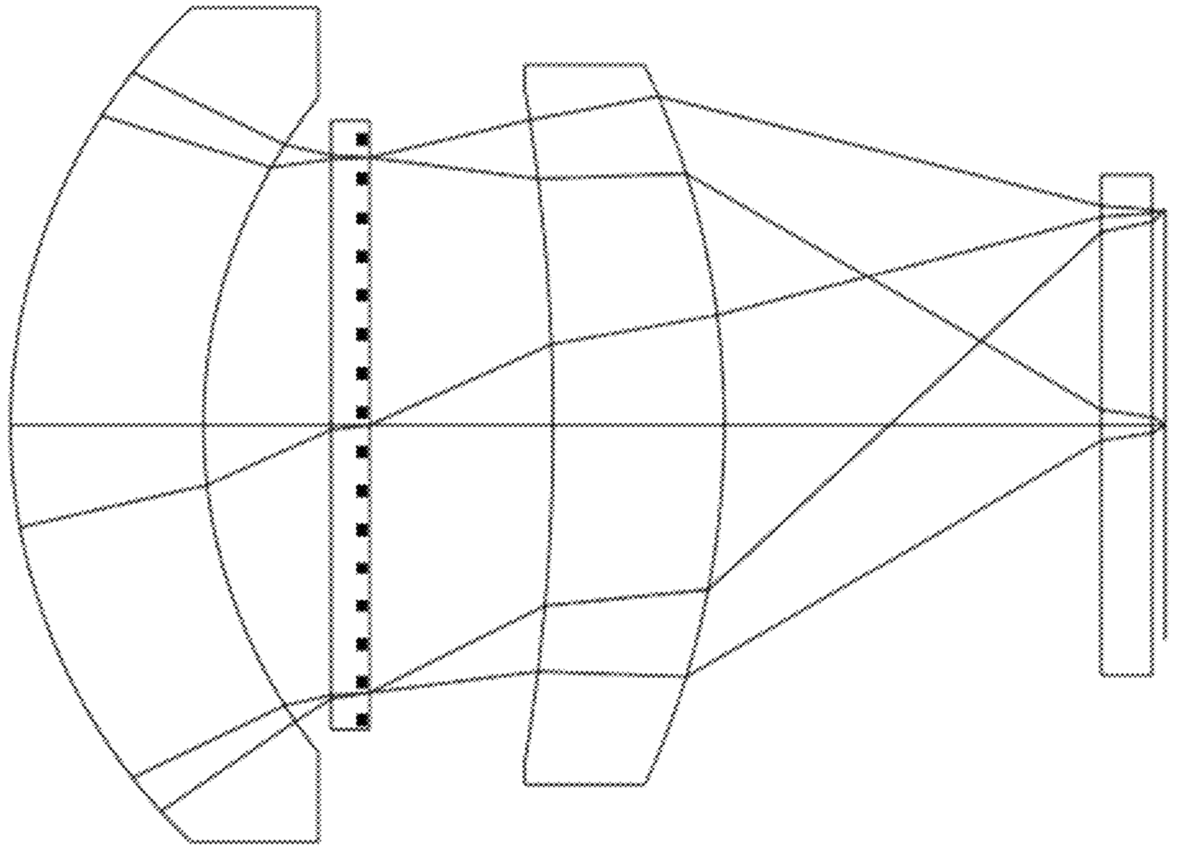
FIG. 21 shows a schematic diagram of the architectural layout of the optical system working at the far-infrared waveband in one embodiment provided by the present application.

FIG. 21 shows a schematic diagram of the architectural layout of the optical system and the optical camera working at the far-infrared waveband in embodiment 3 provided by the present application. As shown in FIG. 21, in embodiment 4, the optical system working at a far-infrared waveband, including three optical elements, the three optical elements being, along the optical axis in order from an object side to an image side: a first sulfur refractive lens, a metalens and a second sulfur refractive lens. The optical system further includes an optical window glass, and the optical window glass is set between the second sulfur refractive lens and the imaging sensor.

TABLE 8

| The system parameters of the optical system of embodiment 4 | |
|---|---|
| System Parameters | Data |
| TTL | 11.32 mm |
| FOV(2ω) | 34° |
| F number | 1.0 |
| Effective focal length | 6.89 mm |
| Working waveband | 8-12 μm |

As can be seen from the Table 8, the optical system provided by the present application works at the waveband from 8 μm to 12 μm, and has a TTL of 11.32 mm and a FOV of 34°. The F number of the optical system is 1.0, which can fully satisfy the requirements of the optical system for the light intake.

Along the direction from the object side to the image side, each surface of the optical system is numbered, and after summarizing the parameters of each surface, Table 9 is obtained as shown below.

TABLE 9

| Parameters of each surface from the first sulfur refractive lens to the image side of embodiment 4 | | | | |
|---|---|---|---|---|
| Surface number | Type of surfaces | Curvature radius | Thickness | Material |
| 1 | Object plane | Infinite | Infinite | — |
| 2 | Spherical plane | 5.57 mm | 1.89 mm | IRG206 |
| 3 | Spherical plane | 5.12 mm | 1.25 mm | — |
| 4 | Spherical plane | Infinite | 0.375 mm | Silicon |
| 5 | Metasurface(Aperture slot) | Infinite | 1.80 mm | — |
| 6 | Spherical plane | −19.66 mm | 1.68 mm | IRG206 |
| 7 | Spherical plane | −8.32 mm | 3.69 mm | — |
| 8 | Spherical plane | Infinite | 0.50 mm | Silicon |
| 9 | Spherical plane | Infinite | 0.13 mm | — |
| 10 | Image plane | Infinite | — | — |

The explanation of Table 9 refers to the explanation of Table 3, and will not repeat here.

Figure 22:
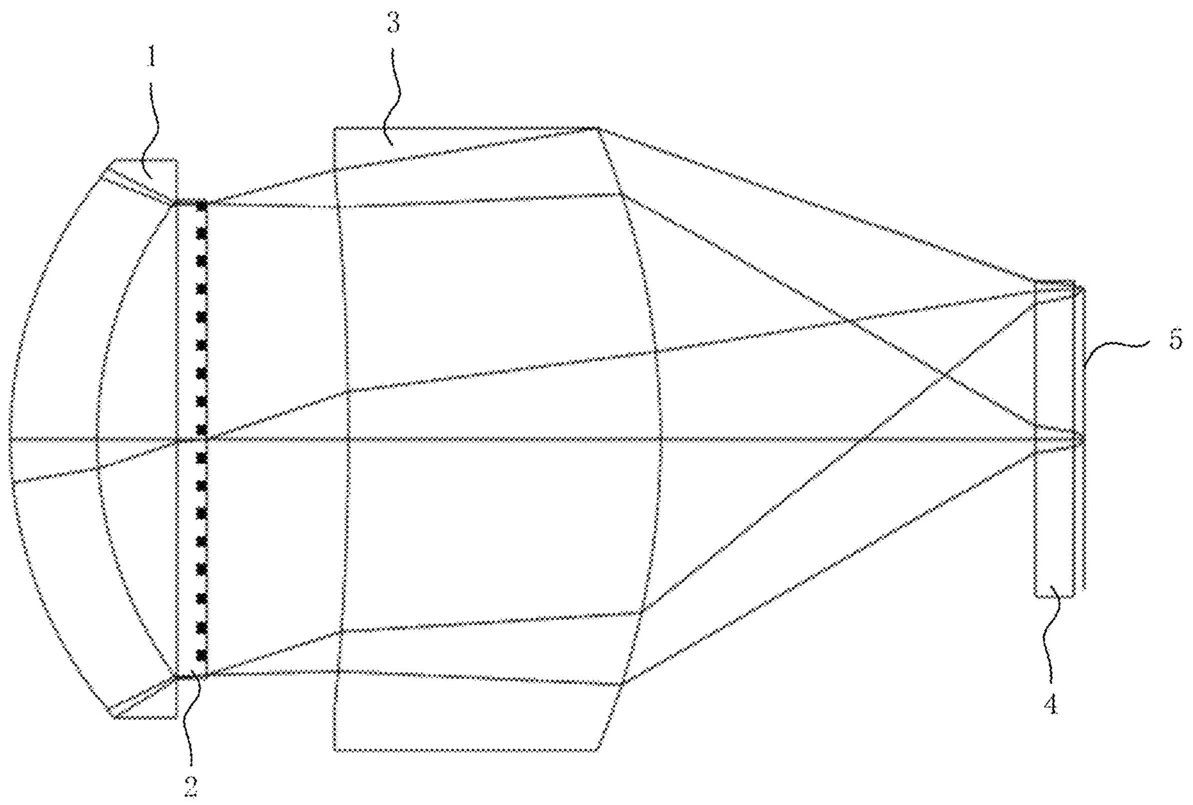
FIG. 22 shows a curve diagram at room temperature between the MTF and field of view of the optical system working at the far-infrared waveband in one embodiment provided by the present application.
Figure 23:
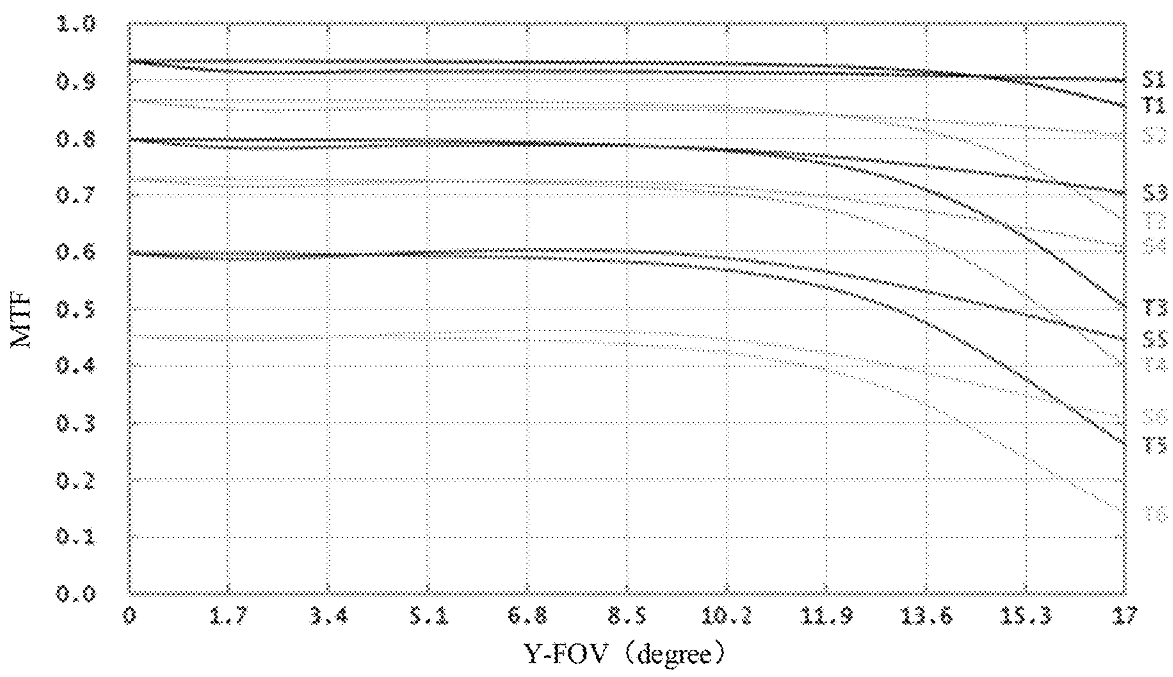
FIG. 23 shows a curve diagram at the temperature of −40° C. between the MTF and field of view of the optical system working at the far-infrared waveband in one embodiment provided by the present application.
Figure 24:
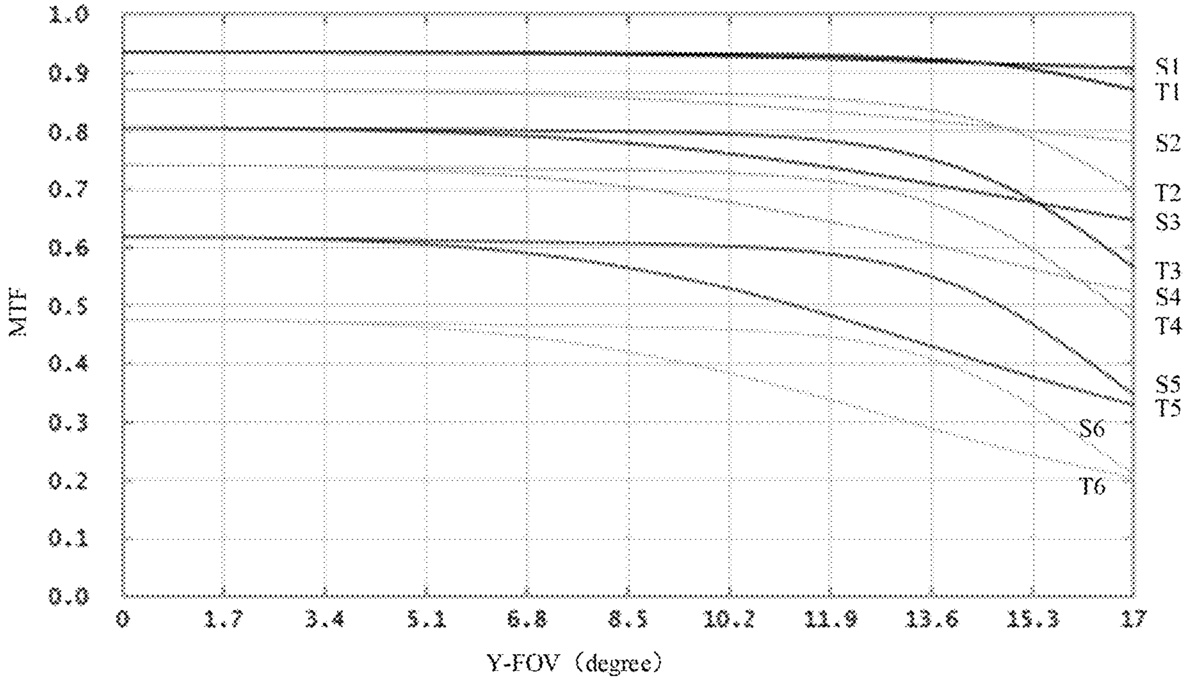
FIG. 24 shows a curve diagram at the temperature of 80° C. between the MTF and field of view of the optical system working at the far-infrared waveband in one embodiment provided by the present application.

FIG. 22 shows a curve diagram at room temperature between the MTF and field of view of the optical system working at the far-infrared waveband in embodiment 4 provided by the present application. In general, the room temperature refers to the environment of 25° C. FIG. 23 shows a curve diagram at the temperature of −40° C. between the MTF and field of view of the optical system working at the far-infrared waveband in embodiment 3 provided by the present application. FIG. 24 shows a curve diagram at the temperature of 80° C. between the MTF and field of view of the optical system working at the far-infrared waveband in embodiment 4 provided by the present application.

From FIG. 22 to FIG. 24, the horizontal axis represents the field of view on the Y axis with a unit of degree; the vertical axis represents the MTF value; and T represents the meridional direction curve and S is the sagittal direction curve. Specifically, the meridional curve T1 and sagittal curve S1 correspond to the spatial frequency of 5.00 (cyc/mm); the meridional curve T2 and sagittal curve S2 correspond to the spatial frequency of 10.00 (cyc/mm); the meridional curve T3 and sagittal curve S3 correspond to the spatial frequency of 15.00 (cyc/mm); the meridional curve T4 and sagittal curve S4 correspond to the spatial frequency of 20.00 (cyc/mm); the meridional curve T5 and sagittal curve S5 correspond to the spatial frequency of 40.00 (cyc/mm); the meridional curve T6 and sagittal curve S6 correspond to the spatial frequency of 42.00 (cyc/mm).

As shown in FIG. 22, the optical system provided by the present application at room temperature the MTF of each spatial frequency is greater than 0.19 at all fields of view, which indicates that image quality of the optical system at room temperature is good. It can be seen from FIG. 23 that the optical system provided by the present application, the MTF of each spatial frequency is greater than 0.15 at the temperature of −40° C. at all fields of view, which indicates that image quality of the optical system at the temperature of −40° C. is good. It can be seen from FIG. 24 that the optical system provided by the present application, the MTF of each spatial frequency is greater than 0.2 at the temperature of 80° C. at all fields of view, which indicates that image quality of the optical system at the temperature of 80° C. is good.

From FIG. 22 to FIG. 24, the optical system provided by the present application at the temperature from −40° C. to 80° C. keeps good image quality all the time, which indicates the optical system has fully realized the athermalization.

Figure 25:
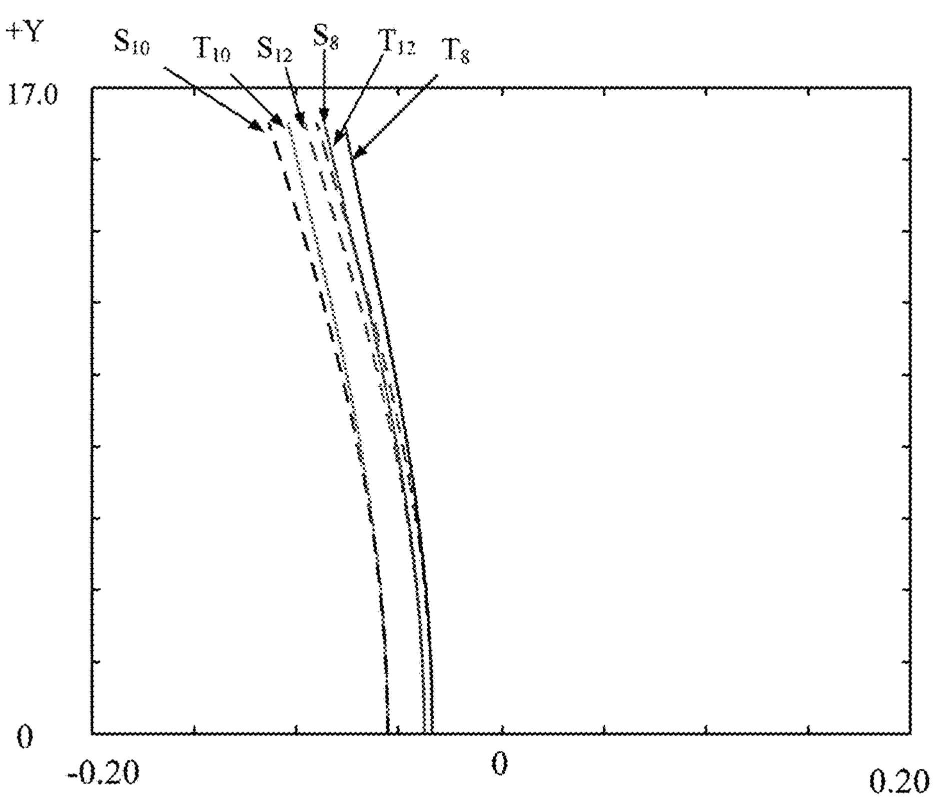
FIG. 25 shows a field curvature diagram of the optical system working at the far-infrared waveband in one embodiment provided by the present application.

FIG. 25 shows a field curvature diagram of the optical system working at the far-infrared waveband in embodiment 4 provided by the present application. In FIG. 25, the horizontal axis represents the offset distance between the actual focus and the image plane and the unit of offset distance is millimeter; the vertical axis represents the field of view in the positive direction along the Y axis, and the unit of field of view is degree. In FIG. 25, T represents the meridional curve, and S represents the sagittal curve. Specifically, the meridional curve $T_8$ and the sagittal curve $S_8$ correspond to the working wavelength of 8 μm; and the meridional curve $T_{10}$ and the sagittal curve $S_{10}$ correspond to the working wavelength of 10 μm; and the meridional curve $T_{12}$ and the sagittal curve $S_{12}$ correspond to the working wavelength of 12 μm.

It can be seen from FIG. 25 that the field curvature is less than 0.08 mm at the wavelengths from 8 μm to 12 μm, which indicates that the field curvature of the optical system is small.

Figure 26:
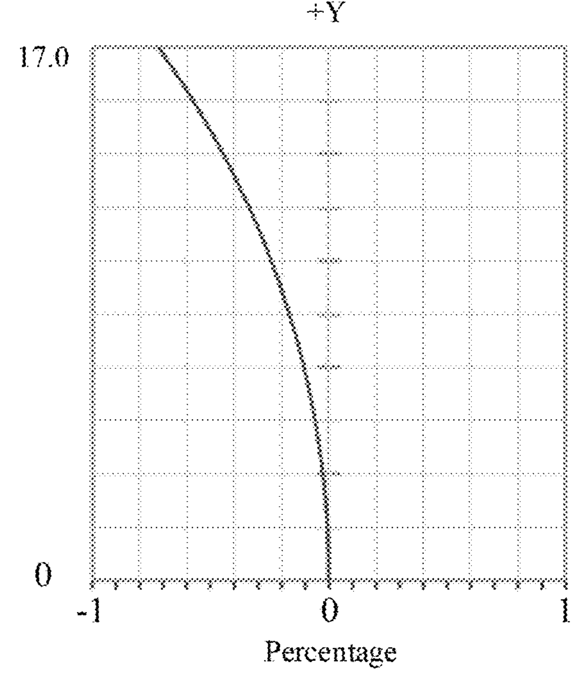
FIG. 26 shows a distortion diagram of the optical system working at the far-infrared waveband in one embodiment provided by the present application.

FIG. 26 shows a distortion diagram of the optical system working at the far-infrared waveband in embodiment 4 provided by the present application. In FIG. 26, the horizontal axis represents the degree of the distortion of imaging and the unit of degree of the distortion is percentage; the vertical axis represents the field of view in the positive direction along the Y axis, and the unit of field of view is degree. FIG. 26 shows the distortion curve at wavelength of 8 μm, the distortion curve at wavelength of 10 μm and the distortion curve at wavelength of 12 μm. And the three curves are almost completely overlapping.

It can be seen from FIG. 26 that in the present application, the distortions corresponding to each wavelength from 8 μm to 12 μm is less than 0.8%, which indicates that the distortion of the optical system is small.

Embodiment 5

Figure 27:
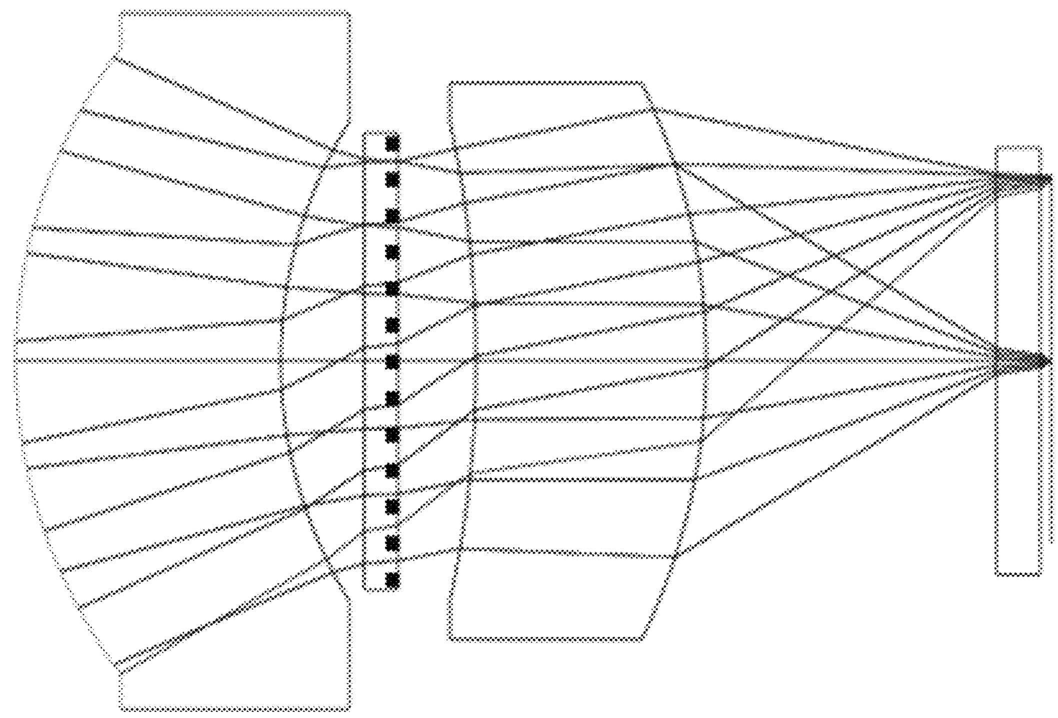
FIG. 27 shows a schematic diagram of the architectural layout of the optical system working at the far-infrared waveband in one embodiment provided by the present application.

FIG. 27 shows a schematic diagram of the architectural layout of the optical system and the optical camera working at the far-infrared waveband in embodiment 5 provided by the present application. As shown in FIG. 27, in embodiment 5, the optical system working at a far-infrared waveband, including three optical elements, the three optical elements being, along the optical axis in order from an object side to an image side: a first sulfur refractive lens, a metalens and a second sulfur refractive lens. The optical system further includes an optical window glass, and the optical window glass is set between the second sulfur refractive lens and the imaging sensor.

TABLE 10

| The system parameters of the optical system of embodiment 5 | |
|---|---|
| System Parameters | Data |
| TTL | 11.70 mm |
| FOV(2ω) | 34° |
| F number | 0.99 |
| Effective focal length | 6.98 mm |
| Working waveband | 8-12 μm |

As can be seen from the Table 10, the optical system provided by the present application works at the waveband from 8 μm to 12 μm, and has a TTL of 11.70 mm and a FOV of 34°. The F number of the optical system is 0.99, which can fully satisfy the requirements of the optical system for the light intake.

Along the direction from the object side to the image side, each surface of the optical system is numbered, and after summarizing the parameters of each surface, Table 11 is obtained as shown below.

TABLE 11

Parameters of each surface from the first sulfur refractive lens to the image side of embodiment 5

| Surface number | Type of surfaces | Curvature radius | Thickness | Material |
|---|---|---|---|---|
| 1 | Object plane | Infinite | Infinite | — |
| 2 | Spherical plane | 6.07 mm | 2.99 mm | IRG206 |
| 3 | Spherical plane | 5.33 mm | 0.94 mm | — |
| 4 | Spherical plane | Infinite | 0.375 mm | Silicon |
| 5 | Metasurface(Aperture slot) | Infinite | 0.89 mm | — |
| 6 | Spherical plane | −13.07 mm | 2.60 mm | IRG206 |
| 7 | Spherical plane | −7.40 mm | 3.28 mm | — |
| 8 | Spherical plane | Infinite | 0.50 mm | Silicon |
| 9 | Spherical plane | Infinite | 0.13 mm | — |
| 10 | Image plane | Infinite | — | — |

The explanation of Table 11 refers to the explanation of Table 3, and will not repeat here.

Figure 28:
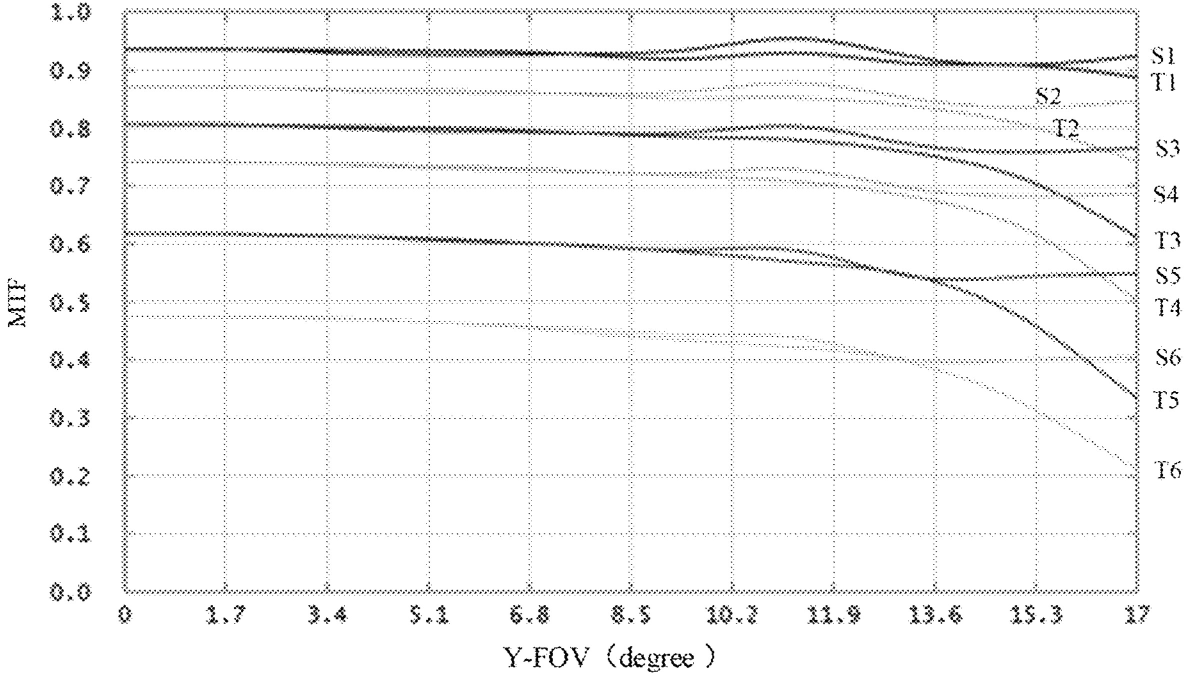
FIG. 28 shows a curve diagram at room temperature between the MTF and field of view of the optical system working at the far-infrared waveband in one embodiment provided by the present application.
Figure 29:
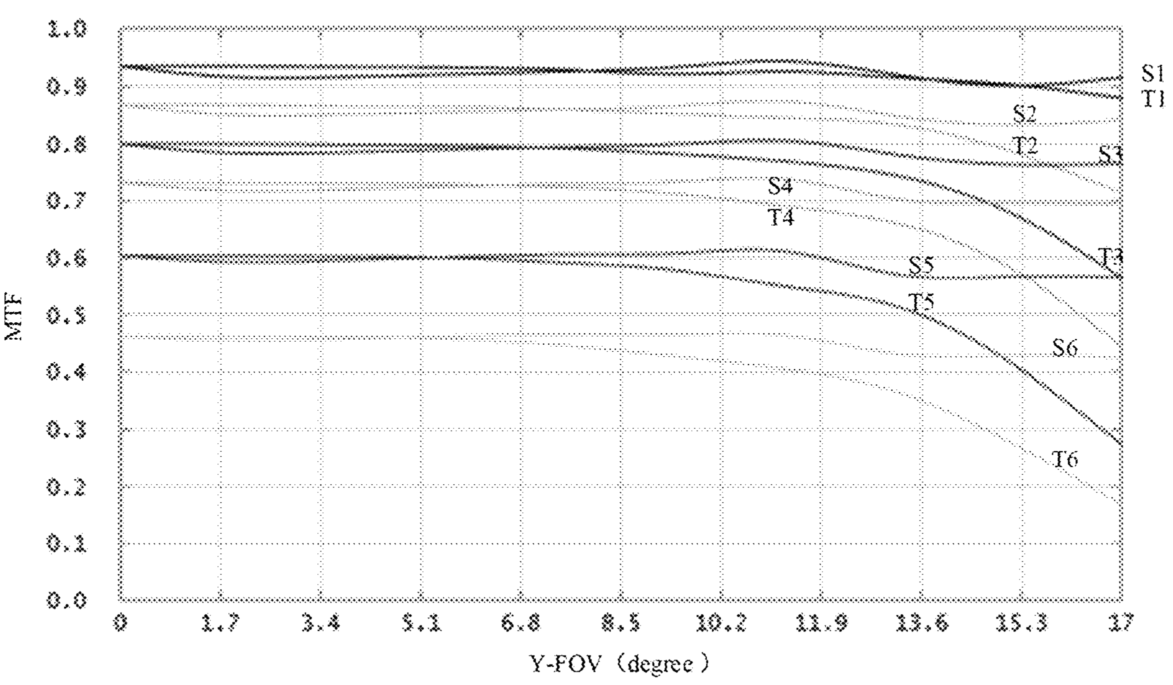
FIG. 29 shows a curve diagram at the temperature of −40° C. between the MTF and field of view of the optical system working at the far-infrared waveband in one embodiment provided by the present application.
Figure 30:
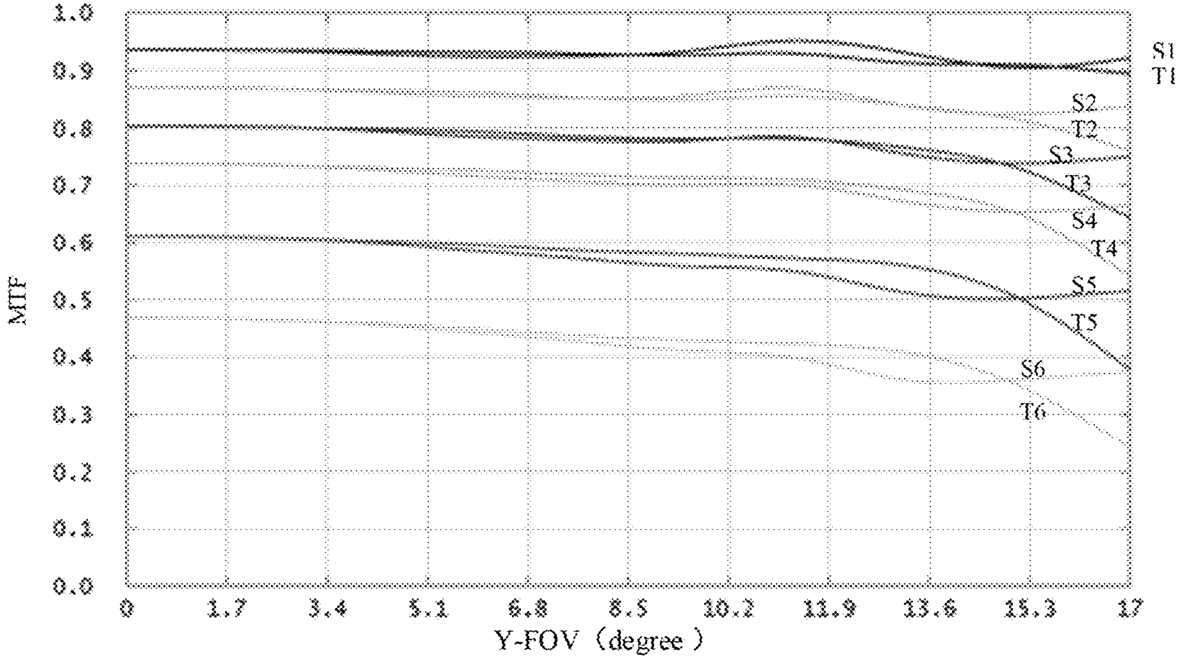
FIG. 30 shows a curve diagram at the temperature of 80° C. between the MTF and field of view of the optical system working at the far-infrared waveband in one embodiment provided by the present application.

FIG. 28 shows a curve diagram at room temperature between the MTF and field of view of the optical system working at the far-infrared waveband in embodiment 4 provided by the present application. In general, the room temperature refers to the environment of 25° C. FIG. 29 shows a curve diagram at the temperature of −40° C. between the MTF and field of view of the optical system working at the far-infrared waveband in embodiment 3 provided by the present application. FIG. 30 shows a curve diagram at the temperature of 80° C. between the MTF and field of view of the optical system working at the far-infrared waveband in embodiment 4 provided by the present application.

From FIG. 28 to FIG. 30, the horizontal axis represents the field of view on the Y axis with a unit of degree; the vertical axis represents the MTF value; and T represents the meridional direction curve and S is the sagittal direction curve. Specifically, the meridional curve T1 and sagittal curve S1 correspond to the spatial frequency of 5.00 (cyc/mm); the meridional curve T2 and sagittal curve S2 correspond to the spatial frequency of 10.00 (cyc/mm); the meridional curve T3 and sagittal curve S3 correspond to the spatial frequency of 15.00 (cyc/mm); the meridional curve T4 and sagittal curve S4 correspond to the spatial frequency of 20.00 (cyc/mm); the meridional curve T5 and sagittal curve S5 correspond to the spatial frequency of 40.00 (cyc/mm); the meridional curve T6 and sagittal curve S6 correspond to the spatial frequency of 42.00 (cyc/mm).

As shown in FIG. 28, the optical system provided by the present application at room temperature the MTF of each spatial frequency is greater than 0.2 at all fields of view, which indicates that image quality of the optical system at room temperature is good. It can be seen from FIG. 29 that the optical system provided by the present application, the MTF of each spatial frequency is greater than 0.18 at the temperature of −40° C. at all fields of view, which indicates that image quality of the optical system at the temperature of −40° C. is good. It can be seen from FIG. 30 that the optical system provided by the present application, the MTF of each spatial frequency is greater than 0.23 at the temperature of 80° C. at all fields of view, which indicates that image quality of the optical system at the temperature of 80° C. is good.

From FIG. 28 to FIG. 30, the optical system provided by the present application at the temperature from −40° C. to 80° C. keeps good image quality all the time, which indicates the optical system has fully realized the athermalization.

Figure 31:
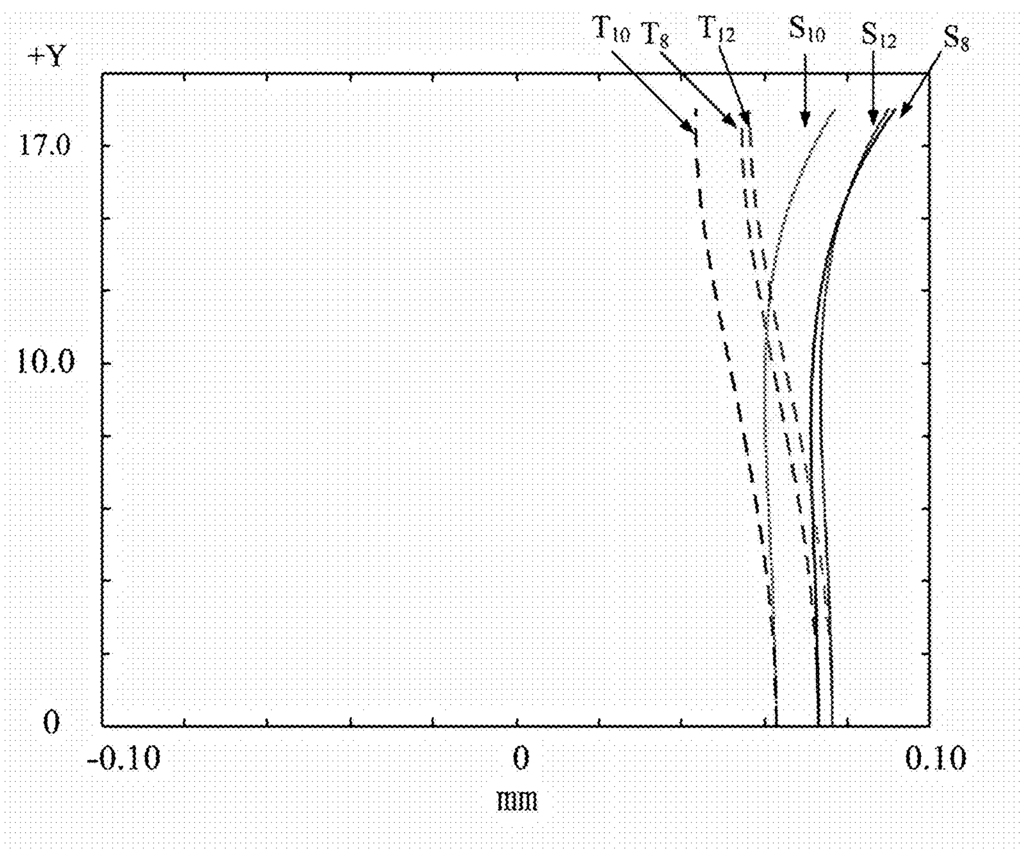
FIG. 31 shows a field curvature diagram of the optical system working at the far-infrared waveband in one embodiment provided by the present application.

FIG. 31 shows a field curvature diagram of the optical system working at the far-infrared waveband in embodiment 5 provided by the present application. In FIG. 31, the horizontal axis represents the offset distance between the actual focus and the image plane and the unit of offset distance is millimeter; the vertical axis represents the field of view in the positive direction along the Y axis, and the unit of field of view is degree. In FIG. 31, T represents the meridional curve, and S represents the sagittal curve. Specifically, the meridional curve $T_8$ and the sagittal curve $S_8$ correspond to the working wavelength of 8 μm; and the meridional curve $T_{10}$ and the sagittal curve $S_{10}$ correspond to the working wavelength of 10 μm; and the meridional curve $T_{12}$ and the sagittal curve $S_{12}$ correspond to the working wavelength of 12 μm.

It can be seen from FIG. 31 that the field curvature is less than 0.04 mm at the wavelengths from 8 μm to 12 μm, which indicates that the field curvature of the optical system is small.

Figure 32:
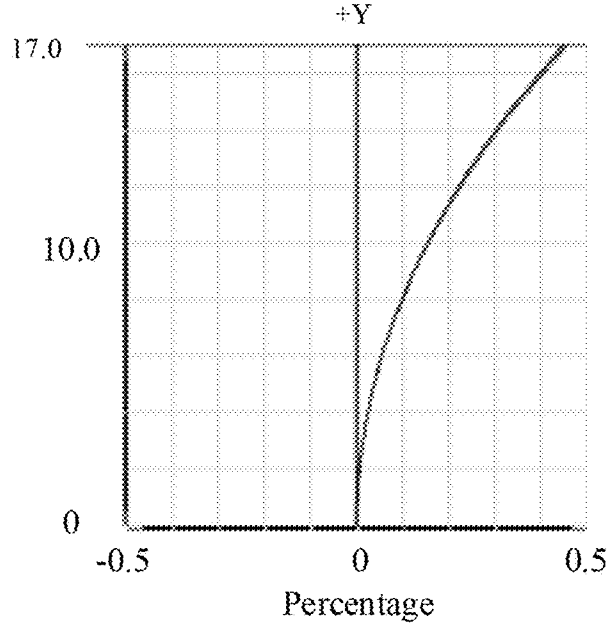
FIG. 32 shows a distortion diagram of the optical system working at the far-infrared waveband in one embodiment provided by the present application.

FIG. 32 shows a distortion diagram of the optical system working at the far-infrared waveband in embodiment 5 provided by the present application. In FIG. 32, the horizontal axis represents the degree of the distortion of imaging and the unit of degree of the distortion is percentage; the vertical axis represents the field of view in the positive direction along the Y axis, and the unit of field of view is degree. FIG. 32 shows the distortion curve at wavelength of 8 μm, the distortion curve at wavelength of 10 μm and the distortion curve at wavelength of 12 μm. And the three curves are almost completely overlapping.

It can be seen from FIG. 32 that in the present application the distortions corresponding to each wavelength from 8 μm to 12 μm is less than 0.45%, which indicates that the distortion of the optical system is small.

Embodiment 6

Figure 33:
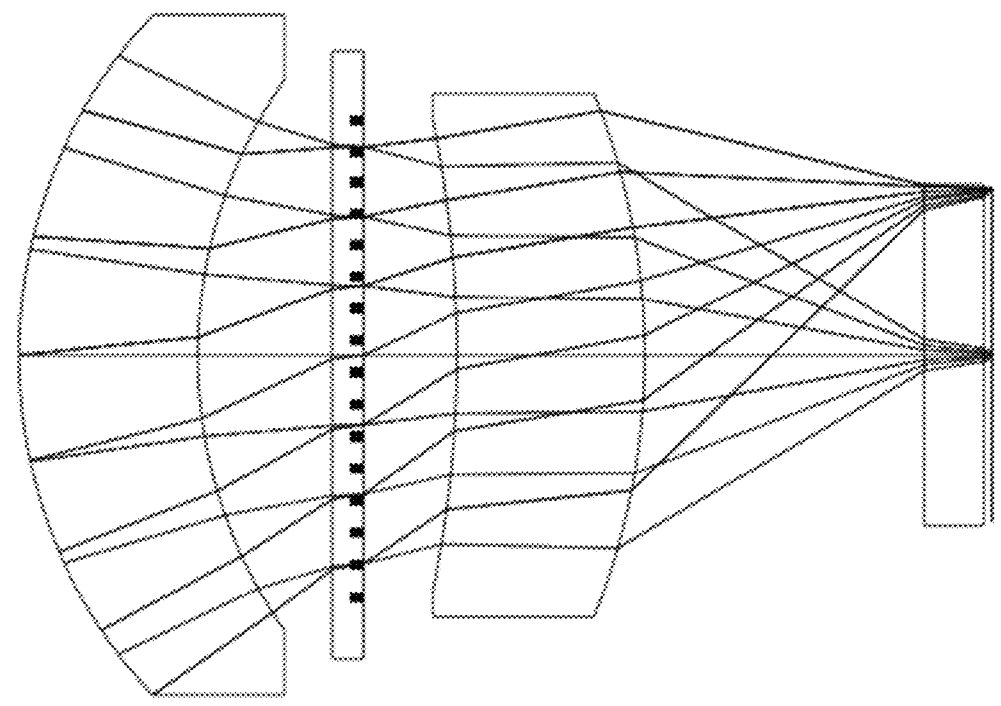
FIG. 33 shows a schematic diagram of the architectural layout of the optical system working at the far-infrared waveband in one embodiment provided by the present application.

FIG. 33 shows a schematic diagram of the architectural layout of the optical system and the optical camera working at the far-infrared waveband in embodiment 6 provided by the present application. As shown in FIG. 33, in embodiment 6, the optical system working at a far-infrared waveband, including three optical elements, the three optical elements being, along the optical axis in order from an object side to an image side: a first sulfur refractive lens, a metalens and a second sulfur refractive lens. The optical system further includes an optical window glass, and the optical window glass is set between the second sulfur refractive lens and the imaging sensor.

TABLE 12

The various system parameters of the optical system of embodiment 6

| System Parameters | Data |
|---|---|
| TTL | 11.43 mm |
| FOV(2ω) | 30.9° |
| F number | 1.0 |
| Effective focal length | 6.90 mm |
| Working waveband | 8-12 μm |

As can be seen from the Table 10, the optical system provided by the present application works at the waveband from 8 μm to 12 μm, and has a TTL of 11.43 mm and a FOV of 34°. The F number of the optical system is 1.0, which can fully satisfy the requirements of the optical system for the light intake.

Along the direction from the object side to the image side, each surface of the optical system is numbered, and after summarizing the parameters of each surface, Table 12 is obtained as shown below.

TABLE 13

| Parameters of each surface from the first sulfur refractive lens to the image side of embodiment 6 | | | | |
|---|---|---|---|---|
| Surface number | Type of surfaces | Curvature radius | Thickness | Material |
| 1 | Object plane | Infinite | Infinite | — |
| 2 | Spherical plane | 5.65 mm | 2.10 mm | IRG206 |
| 3 | Spherical plane | 5.45 mm | 1.58 mm | — |
| 4 | Spherical plane | Infinite | 0.375 mm | Silicon |
| 5 | Metasurface(Aperture slot) | Infinite | 1.09 mm | — |
| 6 | Spherical plane | −13.20 mm | 2.20 mm | IRG206 |
| 7 | Spherical plane | −7.94 mm | 3.28 mm | — |
| 8 | Spherical plane | Infinite | 0.70 mm | Silicon |
| 9 | Spherical plane | Infinite | 0.10 mm | — |
| 10 | Image plane | Infinite | — | — |

The explanation of Table 13 refers to the explanation of Table 3, and will not repeat here.

Figure 34:
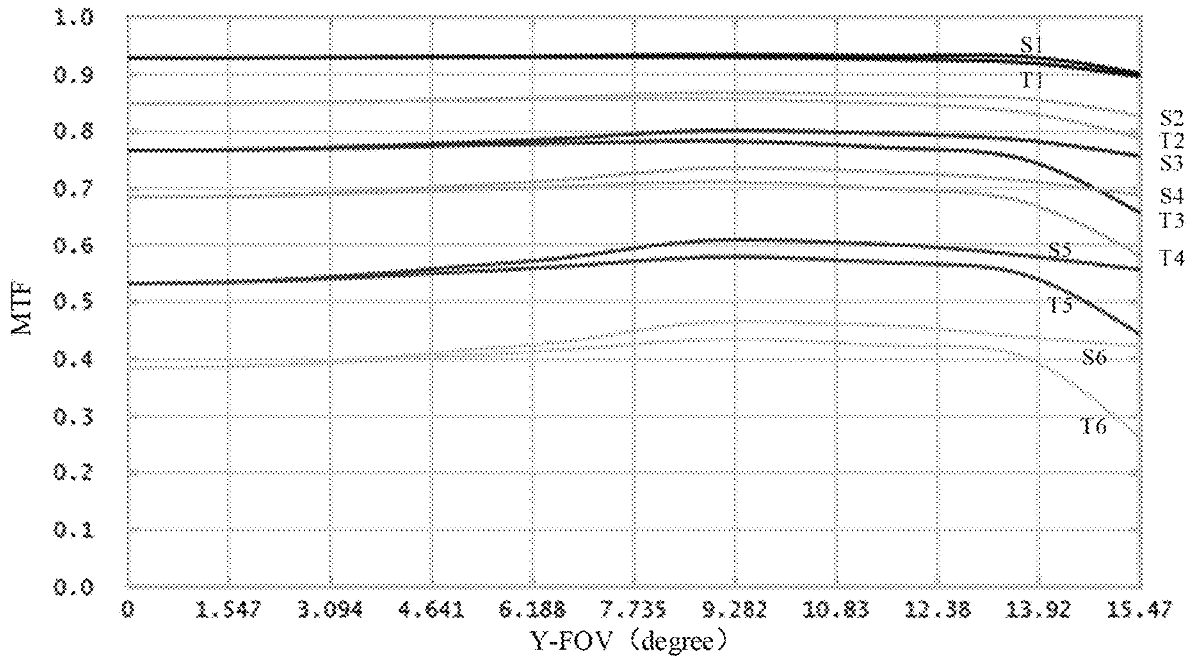
FIG. 34 shows a curve diagram at room temperature between the MTF and field of view of the optical system working at the far-infrared waveband in one embodiment provided by the present application.
Figure 35:
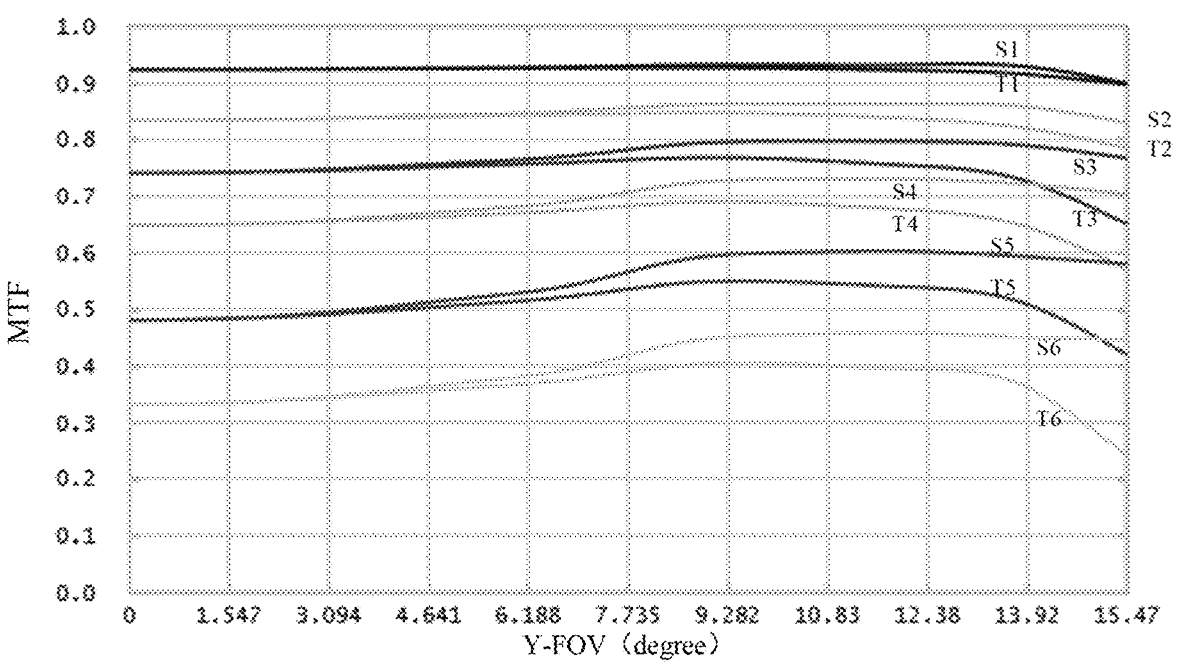
FIG. 35 shows a curve diagram at the temperature of −40° C. between the MTF and field of view of the optical system working at the far-infrared waveband in one embodiment provided by the present application.
Figure 36:
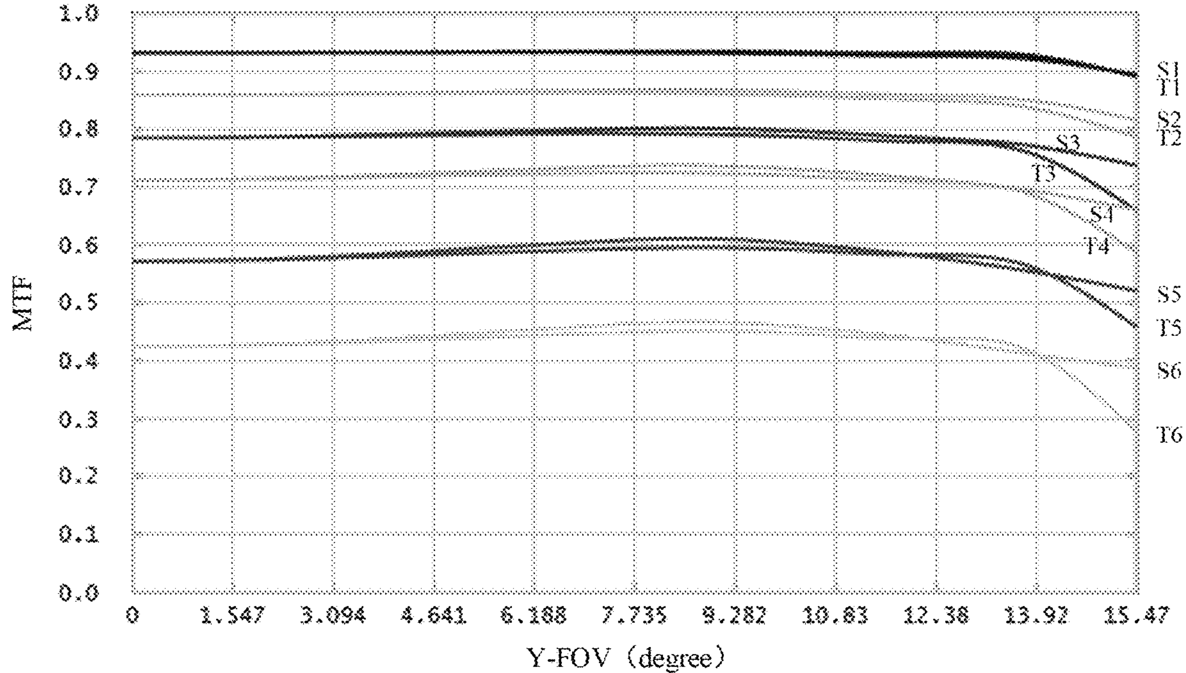
FIG. 36 shows a curve diagram at the temperature of 80° C. between the MTF and field of view of the optical system working at the far-infrared waveband in one embodiment provided by the present application.

FIG. 34 shows a curve diagram at room temperature between the MTF and field of view of the optical system working at the far-infrared waveband in embodiment 6 provided by the present application. In general, the room temperature refers to the environment of 25° C. FIG. 35 shows a curve diagram at the temperature of −40° C. between the MTF and field of view of the optical system working at the far-infrared waveband in embodiment 6 provided by the present application. FIG. 36 shows a curve diagram at the temperature of 80° C. between the MTF and field of view of the optical system working at the far-infrared waveband in embodiment 6 provided by the present application.

From FIG. 34 to FIG. 36, the horizontal axis represents the field of view on the Y axis with a unit of degree; the vertical axis represents the MTF value; and T represents the meridional direction curve and S is the sagittal direction curve. Specifically, the meridional curve T1 and sagittal curve S1 correspond to the spatial frequency of 5.00 (cyc/mm); the meridional curve T2 and sagittal curve S2 correspond to the spatial frequency of 10.00 (cyc/mm); the meridional curve T3 and sagittal curve S3 correspond to the spatial frequency of 15.00 (cyc/mm); the meridional curve T4 and sagittal curve S4 correspond to the spatial frequency of 20.00 (cyc/mm); the meridional curve T5 and sagittal curve S5 correspond to the spatial frequency of 40.00 (cyc/mm); the meridional curve T6 and sagittal curve S6 correspond to the spatial frequency of 42.00 (cyc/mm).

As shown in FIG. 34, the optical system provided by the present application at room temperature the MTF of each spatial frequency is greater than 0.25 at all fields of view, which indicates that image quality of the optical system at room temperature is good. It can be seen from FIG. 35 that the optical system provided by the present application, the MTF of each spatial frequency is greater than 0.23 at the temperature of −40° C. at all fields of view, which indicates that image quality of the optical system at the temperature of −40° C. is good. It can be seen from FIG. 36 that the optical system provided by the present application, the MTF of each spatial frequency is greater than 0.27 at the temperature of 80° C. at all fields of view, which indicates that image quality of the optical system at the temperature of 80° C. is good.

From FIG. 34 to FIG. 36, the optical system provided by the present application at the temperature from −40° C. to 80° C. keeps good image quality all the time, which indicates the optical system has fully realized the athermalization.

Figure 37:
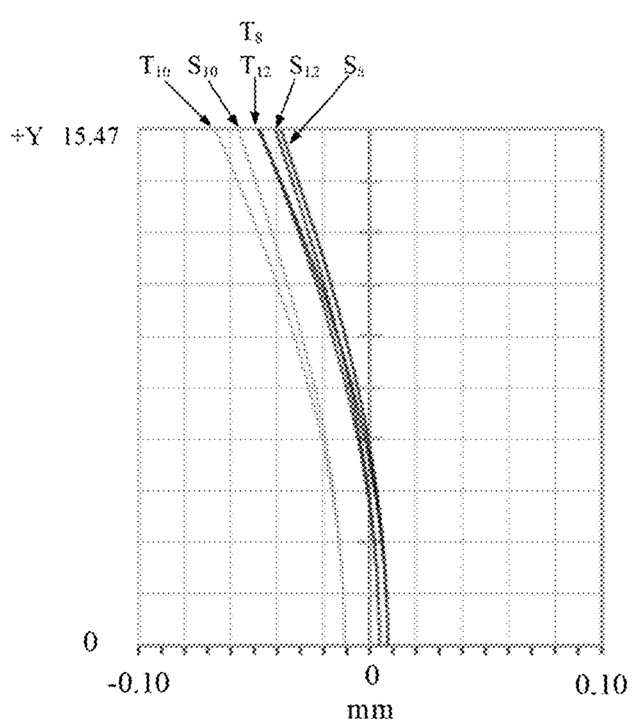
FIG. 37 shows a field curvature diagram of the optical system working at the far-infrared waveband in one embodiment provided by the present application.

FIG. 37 shows a field curvature diagram of the optical system working at the far-infrared waveband in embodiment 6 provided by the present application. In FIG. 37, the horizontal axis represents the offset distance between the actual focus and the image plane and the unit of offset distance is millimeter; the vertical axis represents the field of view in the positive direction along the Y axis, and the unit of field of view is degree. In FIG. 37, T represents the meridional curve, and S represents the sagittal curve. Specifically, the meridional curve $T_8$ and the sagittal curve $S_8$ correspond to the working wavelength of 8 μm; and the meridional curve $T_{10}$ and the sagittal curve $S_{10}$ correspond to the working wavelength of 10 μm; and the meridional curve $T_{12}$ and the sagittal curve $S_{12}$ correspond to the working wavelength of 12 μm.

It can be seen from FIG. 37 that the field curvature is less than 0.06 mm at the wavelengths from 8 μm to 12 μm, which indicates that the field curvature of the optical system is small.

Figure 38:
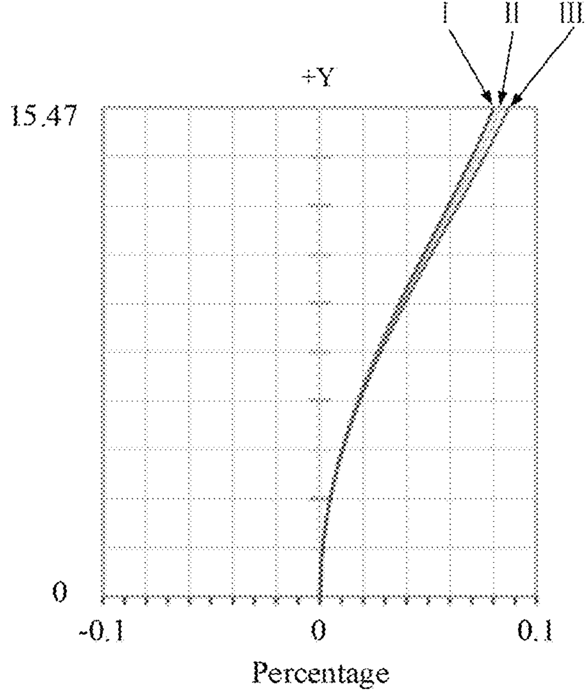
FIG. 38 shows a distortion diagram of the optical system working at the far-infrared waveband in one embodiment provided by the present application.

FIG. 38 shows a distortion diagram of the optical system working at the far-infrared waveband in embodiment 6 provided by the present application. In FIG. 38, the horizontal axis represents the degree of the distortion of imaging and the unit of degree of the distortion is percentage; the vertical axis represents the field of view in the positive direction along the Y axis, and the unit of field of view is degree. FIG. 38 shows the distortion curve I at wavelength of 8 μm, the distortion curve II at wavelength of 10 μm and the distortion curve III at wavelength of 12 μm. And the three curves are almost completely overlapping.

It can be seen from FIG. 38 that in the present application, the distortions corresponding to each wavelength from 8 μm to 12 μm is less than 0.09%, which indicates that the distortion of the optical system is small.

After summarizing the lens parameters of the optical system provided by the above seven embodiments, Table 14 is shown below. The displays in Table 14 mainly are used to explain the conditions met by the optical system provided in this application, and are experimentally verified and supported.

It should be noted that since n represents the refractive index of the first or second sulfur refractive lens, n in each embodiment in Table 14 has two values. Specifically, in the same embodiment, the former value represents the refractive index of the first sulfur refractive lens, and the latter value represents the refractive index of the second sulfur refractive lens. Similarly, the specific situations of $|C_1|$, $|C_2|$, V and $n*(|C_1|+|C_2|)$ is not repeated here.

It should be noted that because a metalens contains many nanostructures, and group delay of different nanostructures is usually different, for nanostructures of the metalens in each embodiment, the discrete specific value of its group delay hasn't been displayed. In the following table, a numerical range of its group delay GD is displayed in the Table 14. Similarly, a numerical range is used to represent the condition of $$\frac{GD * V}{1000}.$$

TABLE 14

The lens parameters of the optical system provided by the present embodiments

| Condition | Embodiment 1 | | Embodiment 2 | | Embodiment3 | |
|---|---|---|---|---|---|---|
| n | 2.77 | 2.77 | 2.77 | 2.77 | 2.78 | 2.78 |
| $\|C_1\|$(1/mm) | 0.18 | 0.03 | 0.19 | 0.70 | 0.17 | 0.08 |
| $\|C_2\|$(1/mm) | 0.20 | 0.10 | 0.20 | 0.12 | 0.19 | 0.14 |
| GD(fs) | 40 ~ 130 | | | | | |
| V | 132.77 | 132.77 | 132.77 | 132.77 | 137.71 | 137.71 |
| $\frac{GD * V}{1000}(fs)$ | 5.31 ~ 17.26 | | | | | |
| M(rad/mm) | 26.43 | | 21.17 | | 20.63 | |
| $f_1$(mm) | 43.46 | | 21.39 | | 15.00 | |
| $f_2$(mm) | 7.37 | | 8.43 | | 7.93 | |
| n * ($\|C_1\|$ + $\|C_2\|$) (1/mm) | 1.06 | 0.36 | 1.06 | 0.53 | 1.00 | 0.62 |
| $\frac{M}{f_1 + f_2}(\text{rad/mm}^2)$ | 0.52 | | 0.71 | | 0.90 | |

| Condition | Embodiment4 | | Embodiment 5 | | Embodiment 6 | |
|---|---|---|---|---|---|---|
| n | 2.78 | 2.78 | 2.78 | 2.78 | 2.78 | 2.78 |
| $\|C_1\|$(1/mm) | 0.18 | 0.05 | 0.16 | 0.08 | 0.18 | 0.08 |
| $\|C_2\|$(1/mm) | 0.20 | 0.12 | 0.19 | 0.14 | 0.18 | 0.13 |
| GD(fs) | 40 ~130 | | | | | |
| V | 137.71 | 137.71 | 137.71 | 137.71 | 137.71 | 137.71 |
| $\frac{GD * V}{1000}(fs)$ | 5.51 ~ 17.90 | | | | | |
| M(rad/mm) | 24.17 | | 22.87 | | 23.06 | |
| $f_1$(mm) | 21.36 | | 15.45 | | 15.17 | |
| $f_2$(mm) | 7.41 | | 7.41 | | 8.85 | |
| n * ($\|C_1\|$ + $\|C_2\|$) (1/mm) | 1.04 | 0.47 | 0.98 | 0.59 | 1.04 | 0.82 |
| $\frac{M}{f_1 + f_2}(\text{rad/mm}^2)$ | 0.84 | | 1 | | 0.96 | |

The above is only a specific embodiment of the embodiments of this disclosure, but the scope of protection of the embodiment of this disclosure is not limited to this. And those skilled in the field can easily think of any change or substitution for this disclosure, which should be covered within the protection scope of this disclosure. Therefore, the scope of the protection of the present disclosure shall be the scope of the claims.

What is claimed is:

1. An optical system working at a far-infrared waveband, comprising three optical elements, the three optical elements being, along the optical axis in order from an object side to an image side: a first sulfur refractive lens, a metalens and a second sulfur refractive lens;

the first sulfur refractive lens and the second sulfur refractive lens have positive refractive power;

each of three optical elements comprising an object-side surface facing towards the object side and an image-side surface facing towards the image side;

the metalens comprises a substrate and a plurality of unit cells, and a plurality of nanostructures are set in the unit cells;

the optical system satisfies the following condition with a unit of 1/mm:

$$0.25 \leq n * (|C_1| + |C_2|) \leq 2.01$$

wherein when n is a refractive index of the first sulfur refractive lens, $C_1$ is a curvature of the object-side surface of the first refractive lens, $C_2$ is a curvature of the image-side surface of the first refractive lens; when n is a refractive index of the second sulfur refractive lens, $C_1$ is a curvature of the object-side surface of the second refractive lens, $C_2$ is a curvature of the image-side surface of the second refractive lens.

2. The optical system according to claim 1, wherein the optical system satisfies the following condition with a unit of 1/mm:

$$0.36 \leq n * (|C_1| + |C_2|) \leq 1.06$$

wherein when n is a refractive index of the first sulfur refractive lens, $C_1$ is a curvature of the object-side surface of the first refractive lens, $C_2$ is a curvature of the image-side surface of the first refractive lens; when n is a refractive index of the second sulfur refractive lens, $C_1$ is a curvature of the object-side surface of the second refractive lens, $C_2$ is a curvature of the image-side surface of the second refractive lens.

3. The optical system according to claim 1, wherein the optical system satisfies the following condition with a unit of fs:

$$5.31 \leq \frac{GD * V}{1000} \leq 17.90$$

wherein GD is a group delay of the plurality of nanostructures, V is the Abbe number of the first sulfur refractive lens or the second sulfur refractive lens.

4. The optical system according to claim 3, wherein the optical system satisfies the following condition with a unit of fs:

$$6.77 \leq \frac{GD * V}{1000} \leq 16.11$$

wherein GD is the group delay of the plurality of nanostructures, V is the Abbe number of the first sulfur refractive lens or the second sulfur refractive lens.

5. The optical system according to claim 1, wherein the first sulfur refractive lens and the second sulfur refractive lens both are spherical lenses; and the optical system satisfies the following condition with a unit of rad/mm$^2$:

$$0.48 \leq \frac{M}{f_1 + f_2} \leq 1.34$$

wherein M is the maximum value of the absolute slope of the phase of the metalens, $f_1$ is a focal length of the first sulfur refractive lens, $f_2$ is a focal length of the second sulfur refractive lens.

6. The optical system according to claim 5, wherein the first sulfur refractive lens and the second sulfur refractive lens both are spherical lenses; and the optical system satisfies the following condition with a unit of rad/$mm^2$:

$$0.52 \leq \frac{M}{f_1 + f_2} \leq 1.00$$

wherein M is the maximum value of the absolute slope of the phase of the metalens, $f_1$ is the focal length of the first sulfur refractive lens, $f_2$ is a focal length of the second sulfur refractive lens.

7. The optical system according to claim 1, wherein the nanostructures are positive nanostructures.

8. The optical system according to claim 1, wherein the nanostructures are negative nanostructures.

9. The optical system according to claim 1, wherein the metalens comprises at least one layer of the unit cells.

10. The optical system according to claim 1, wherein the optical system further comprises: an aperture slot; the aperture slot is set on a surface of the metalens.

11. The optical system according to claim 1, wherein the optical system further comprises: an aperture slot; an interval is set between the aperture slot and the metalens, and the interval is filled with air.

12. The optical system according to claim 1, wherein the object-side surface of the first sulfur refractive lens is convex surface and the image-side surface of the first sulfur refractive lens is a concave surface;

the object-side surface of the second sulfur refractive lens and the image-side surface of the second sulfur refractive lens is a concave surface.

13. The optical system according to claim 1, wherein a total track length of the optical system is less than or equal to 20 mm.

14. The optical system according to claim 1, wherein a field of view of the optical system is greater than or equal to 31°.

15. The optical system according to claim 1, wherein a F number of the optical system is less than or equal to 1.05.

16. The optical system according to claim 1, wherein the MTF of the optical system at all fields of view is greater than or equal to 0.2.

17. An optical camera working at a far-infrared waveband, wherein the optical camera comprises a lens barrel, a pressure ring, a first disconnected ring, a second disconnected ring and the optical system claimed as claim 1;

the pressure ring is set inside the lens barrel;

the pressure ring is against the object-side surface of the first sulfur lens, the first disconnected ring and the object-side surface of the first sulfur lens are in direct contact with each other;

the first disconnected ring and the object-side surface of the metalens are in direct contact with each other;

the second disconnected ring and the object-side surface of the second sulfur refractive lens are in direct contact.

18. The optical camera according to claim 17, wherein the optical camera comprises an optical window glass and an imaging sensor; the imaging sensor is set on the image plane of the optical system;

and the optical window glass is set between the second sulfur refractive lens and the imaging sensor.

* * * * *